(12) United States Patent
Nakamura

(10) Patent No.: US 12,175,149 B2
(45) Date of Patent: Dec. 24, 2024

(54) TERMINAL APPARATUS, IMAGE FORMING APPARATUS, AND SYSTEM

(71) Applicant: SHARP KABUSHIKI KAISHA, Osaka (JP)

(72) Inventor: Yuya Nakamura, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/541,151

(22) Filed: Dec. 15, 2023

(65) Prior Publication Data

US 2024/0201916 A1 Jun. 20, 2024

(30) Foreign Application Priority Data

Dec. 19, 2022 (JP) ................................. 2022-202529

(51) Int. Cl.
G06F 3/12 (2006.01)

(52) U.S. Cl.
CPC ............ *G06F 3/127* (2013.01); *G06F 3/1204* (2013.01); *G06F 3/1253* (2013.01); *G06F 3/1288* (2013.01)

(58) Field of Classification Search
CPC ...... G06F 3/127; G06F 3/1204; G06F 3/1253; G06F 3/1288; G01M 11/0257; G06N 20/00; G06N 3/045; G06N 3/049; G06N 3/063; G06N 3/084; G06V 10/267
USPC ........................................................ 358/1.15
See application file for complete search history.

(56) References Cited

U.S. PATENT DOCUMENTS

| | | | |
|---|---|---|---|
| 8,285,783 B2 * | 10/2012 | Otobe | H04N 21/4415 709/204 |
| 10,070,012 B2 * | 9/2018 | Yamada | G06F 3/1222 |
| 10,825,106 B2 * | 11/2020 | Kikuchi | G06Q 40/12 |
| 2008/0002224 A1 * | 1/2008 | Tanimoto | H04L 67/54 358/1.15 |
| 2010/0100065 A1 * | 4/2010 | Bianco | A61F 13/5323 604/383 |
| 2011/0029619 A1 * | 2/2011 | Bai | H04L 69/329 709/227 |
| 2011/0317215 A1 * | 12/2011 | Ida | G06F 3/1222 358/1.15 |
| 2014/0240765 A1 * | 8/2014 | Nishida | G06F 3/1287 358/1.15 |
| 2015/0116764 A1 * | 4/2015 | Mori | G06F 3/126 358/1.15 |
| 2019/0019257 A1 * | 1/2019 | Kikuchi | G06Q 40/12 |
| 2019/0068824 A1 * | 2/2019 | Kubota | H04N 1/32368 |
| 2019/0146734 A1 * | 5/2019 | Takeishi | G06F 3/1204 358/1.15 |
| 2020/0034087 A1 * | 1/2020 | Iida | G06F 3/127 |
| 2020/0034090 A1 * | 1/2020 | Iida | G06F 3/1238 |

(Continued)

FOREIGN PATENT DOCUMENTS

JP 2015-093394 A 5/2015

*Primary Examiner* — Negussie Worku
(74) *Attorney, Agent, or Firm* — ScienBiziP, P.C.

(57) ABSTRACT

A terminal apparatus includes: a communicator that communicates with an image forming apparatus that generates an individual folder for storing transmitted data for each transmission source of the data; a controller; and a storage. The controller acquires linkage information, and transmits data stored in the storage, with a first individual folder set as a transmission destination, the first individual folder being identified on a basis of the linkage information.

17 Claims, 40 Drawing Sheets

(56) References Cited

U.S. PATENT DOCUMENTS

2021/0006667 A1\* 1/2021 Watariuchi ......... H04N 1/00474
2022/0113919 A1\* 4/2022 Ichikawa ............. G06F 3/1204

\* cited by examiner

| USER NAME | PASSWORD |
|---|---|
| S117332 | abc123 |
| S134535 | qwe456 |
| ⋮ | ⋮ |

FIG. 3A

| USER FOLDER ID | FOLDER NAME | USER NAME |
|---|---|---|
| U0001 | TANAKA | S117332 |
| U0002 | SASAKI | S134535 |
| ⋮ | ⋮ | ⋮ |

FIG. 3B

| INDIVIDUAL FOLDER ID | FOLDER NAME | APPARATUS INFORMATION | | PASSWORD |
|---|---|---|---|---|
| | | USER NAME | COMPUTER NAME | |
| F0001 | S117332 PC-10016L | S117332 | PC-10016L | abc123 |
| F0002 | UserName S-MOBILE3 | UserName | S-MOBILE3 | -- |
| F0003 | S134535 PC-10031K | S134535 | PC-10031K | -- |
| F0004 | S142709 PC-10043P | S142709 | PC-10043P | -- |
| F0005 | S349324 PC10082S | S349324 | PC-10082S | -- |
| ⋮ | ⋮ | ⋮ | ⋮ | ⋮ |

FIG. 3C

| GROUP ID | GROUP NAME | INDIVIDUAL FOLDER ID |
|---|---|---|
| 1 | GROUP_20220727 | F0001, F0002 |
| 2 | GROUP_20220729 | F0003, F0004 |
| ⋮ | ⋮ | ⋮ |

FIG. 3D

| SETTING ITEM NAME | | SETTING VALUE |
|---|---|---|
| PERFORM LINKING | | Yes |
| FOLDER NAME OF TRANSMISSION DESTINATION | | S142709_PC-10043P |
| FOLDER IDENTIFICATION INFORMATION | USER NAME OF LINKED PC | S142709 |
| | COMPUTER NAME OF LINKED PC | PC-10043P |
| ⋮ | | ⋮ |

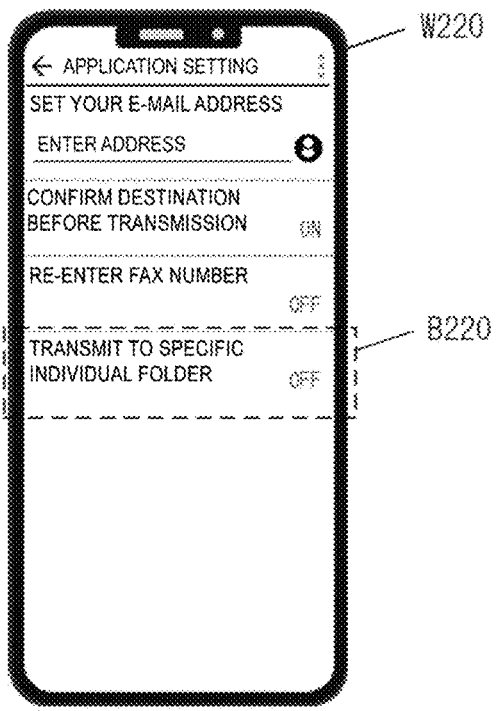
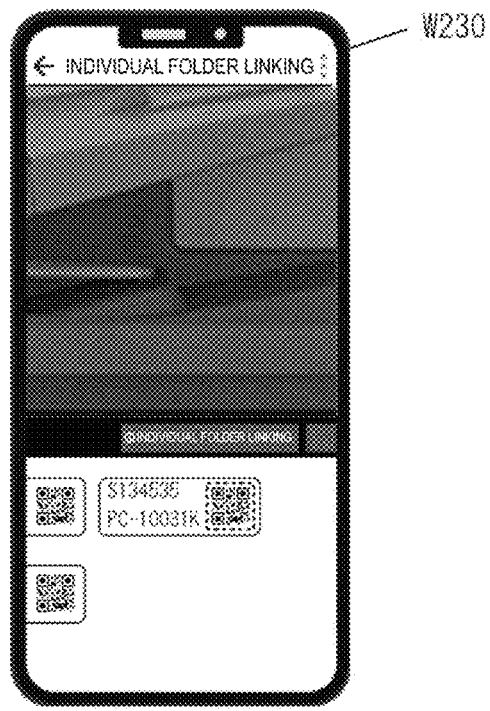
FIG. 19A
FIG. 19B
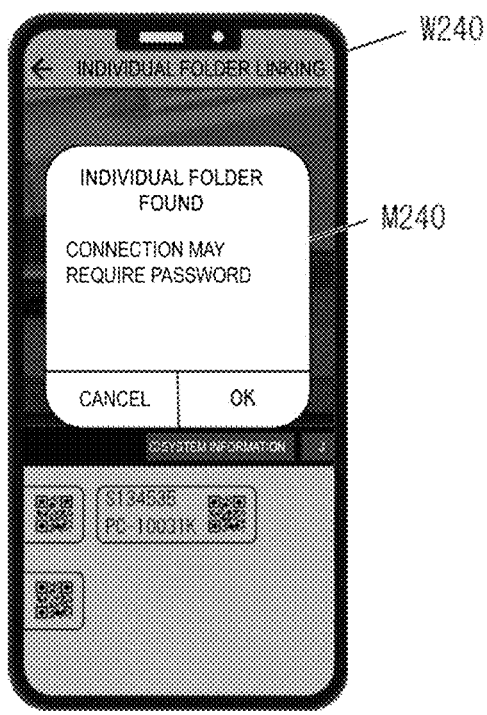
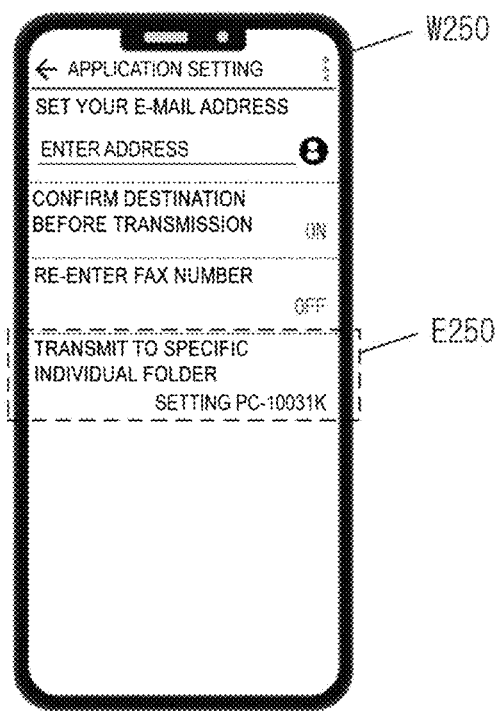
FIG. 19C
FIG. 19D

| ACCOUNT NAME | PASSWORD |
|---|---|
| katou | qwe456 |
| suzuki | asd789 |
| ⋮ | ⋮ |

FIG. 37A

| INDIVIDUAL FOLDER ID | FOLDER NAME | APPARATUS INFORMATION | | ACCOUNT NAME | PASS-WORD |
|---|---|---|---|---|---|
| | | USER NAME | COMPUTER NAME | | |
| F0001 | S117332 PC-10016L | S117332 | PC-10016L | katou | abc123 |
| F0002 | UserName S-MOBILE3 | UserName | S-MOBILE3 | suzuki | -- |
| F0003 | S134535 PC-10031K | S134535 | PC-10031K | suzuki | -- |
| F0004 | S142709 PC-10043P | S142709 | PC-10043P | yoshida | -- |
| F0005 | S349324 PC10082S | S349324 | PC-10082S | katou | -- |
| ⋮ | ⋮ | ⋮ | ⋮ | ⋮ | ⋮ |

FIG. 37B

TERMINAL APPARATUS, IMAGE FORMING APPARATUS, AND SYSTEM

TECHNICAL FIELD

The present disclosure relates to a terminal apparatus and the like.

Some image forming apparatuses such as multifunction peripherals store received data in a predetermined storage area. There has been known a technique of displaying, when displaying an icon list screen that displays an icon of a user who has inputted print data generated by another apparatus to an image forming apparatus, the icon of the user for which print data is held.

SUMMARY

Technical Problem

An object of the present disclosure is to provide, for example, a technique that causes an image forming apparatus to appropriately store data.

Solution to Problem

A terminal apparatus of the present disclosure to solve the problem described above includes: a communicator that communicates with an image forming apparatus that generates an individual folder for storing transmitted data for each transmission source of the data; a controller; and a storage. The controller acquires linkage information, and transmits data stored in the storage, with a first individual folder set as a transmission destination, the first individual folder being identified on a basis of linkage information.

An image forming apparatus of the present disclosure includes: an image former capable of outputting data; a communicator that communicates with a terminal apparatus; a storage; and a controller. The storage includes an individual folder. The controller receives data and information identifying the individual folder from the terminal apparatus via the communicator, stores the data received from the terminal apparatus in a first individual folder on a basis of the information identifying the individual folder when the information identifying the individual folder is received, and generates a second individual folder in the storage and stores the data received from the terminal apparatus in the second individual folder when the information identifying the individual folder is not received.

A system of the present disclosure includes: a first device provided with a storage includes a plurality of folders; and a second device capable of communicating with the first device. The first device outputs linkage information indicating a first folder, the second device, having obtained the linkage information, transmits to the first device specific information and data indicating a folder identified based on the linkage information, the second device, having received data from the first device together with the specified information, stores the data in the first folder identified from the linkage information, and the second device, having received data from the first device without the specified information, stores the data in the second folder different from the first folder.

Advantage Effects of Invention

According to the present disclosure, for example, it is possible to provide a technique for causing an image forming apparatus to appropriately store data.

BRIEF DESCRIPTION OF DRAWINGS

FIGS. 3A to 3D are diagrams illustrating an example of a configuration of data stored in the image forming apparatus of the first embodiment.

FIG. 6 is an example of a data configuration of a setting table of the first embodiment.

FIGS. 19A to 19D are diagrams illustrating an operation example of the second embodiment.

FIGS. 37A and 37B are diagrams illustrating an example of a configuration of data stored in the server apparatus of the sixth embodiment.

DESCRIPTION OF EMBODIMENTS

An embodiment of the present disclosure will be described below with reference to the drawings. Note that the following embodiments are examples for describing the present disclosure, and the technical scope of the explanation described in the claims is not limited to the following description.

Some image forming apparatuses have a function of temporarily storing data for which a print instruction has been issued from an information processing apparatus such as a personal computer (PC) in a storage area of the image forming apparatus, in order to prevent misprints and mistakes in printed matter. The storage area for temporarily storing data for which a print instruction has been issued may be referred to an individual folder or a post-office box.

Generally, the individual folder is generated for each apparatus that has transmitted data (data transmission source). This has led to the following problems.

(1) When a user for which an individual folder has been generated as a result of transmitting data from an information processing apparatus such as a PC to an image forming apparatus transmits data from another apparatus (such as a mobile terminal) to the image forming apparatus, another individual folder is generated on the basis of information of the other apparatus. However, if a plurality of individual folders are sporadically generated for one user, it may be cumbersome for the user to search for or check an individual folder storing desired data.

(2) There has been no way to newly add data from another apparatus (mobile terminal or the like) to an existing individual folder.

(3) There has been no way to group a plurality of individual folders for each user.

In order to solve such problems, in a system according to the following embodiment, an image forming apparatus executes processing for appropriately storing data received from another apparatus.

1. First Embodiment 1.1 Overall Configuration

Figure 1:
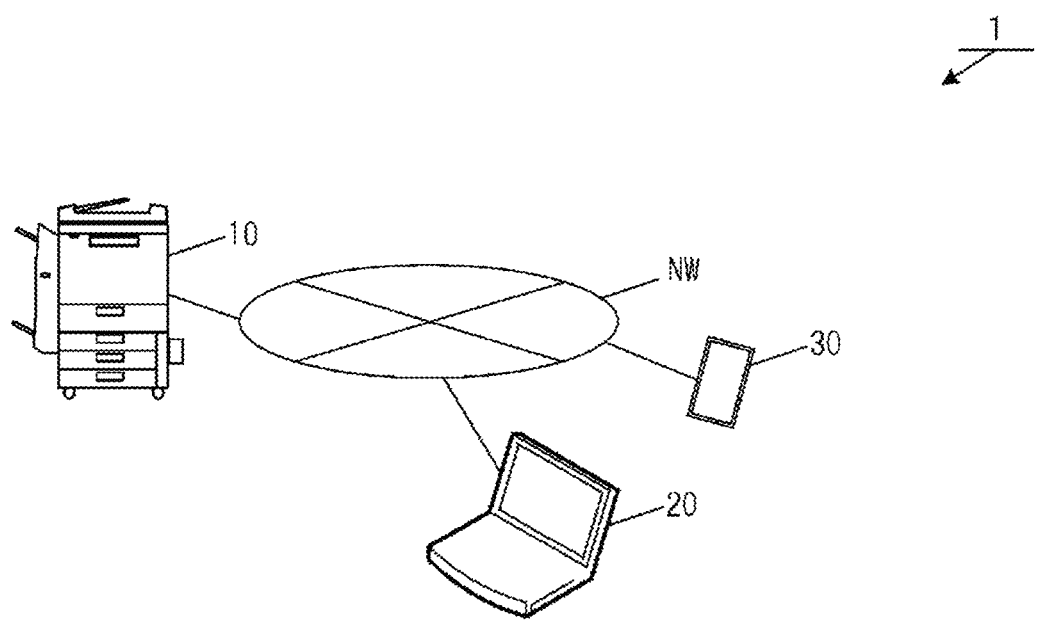
FIG. 1 is a diagram illustrating an overall configuration of a system of a first embodiment.

FIG. 1 is a diagram illustrating an overview of a system 1 according to the present embodiment. The system 1 includes an image forming apparatus 10, an information processing apparatus 20, and a terminal apparatus 30 connected to each other via a network NW. The network NW is, for example, a local area network (LAN), but a network such as a wide area network (WAN) may be used as long as the apparatuses can communicate with each other. The system 1 may include a plurality of the information processing apparatuses 20 and a plurality of the terminal apparatuses 30.

The image forming apparatus 10 is, for example, an apparatus that acquires data of an image by reading a document or communicating with another apparatus, and forms an image on the basis of the acquired data, or transmits the image to another apparatus, to output the data. The image forming apparatus 10 is, for example, a multifunction printer/peripheral (MFP) having a copy function, a scanner function, a printer function, a FAX function, and the like.

The information processing apparatus 20 and the terminal apparatus 30 are apparatuses capable of transmitting data to the image forming apparatus 10. The information processing apparatus 20 is, for example, a personal computer (PC). The terminal apparatus 30 is, for example, a mobile terminal such as a smartphone or a tablet.

1.2 Functional Configuration 1.2.1 Image Forming Apparatus

Figure 2:
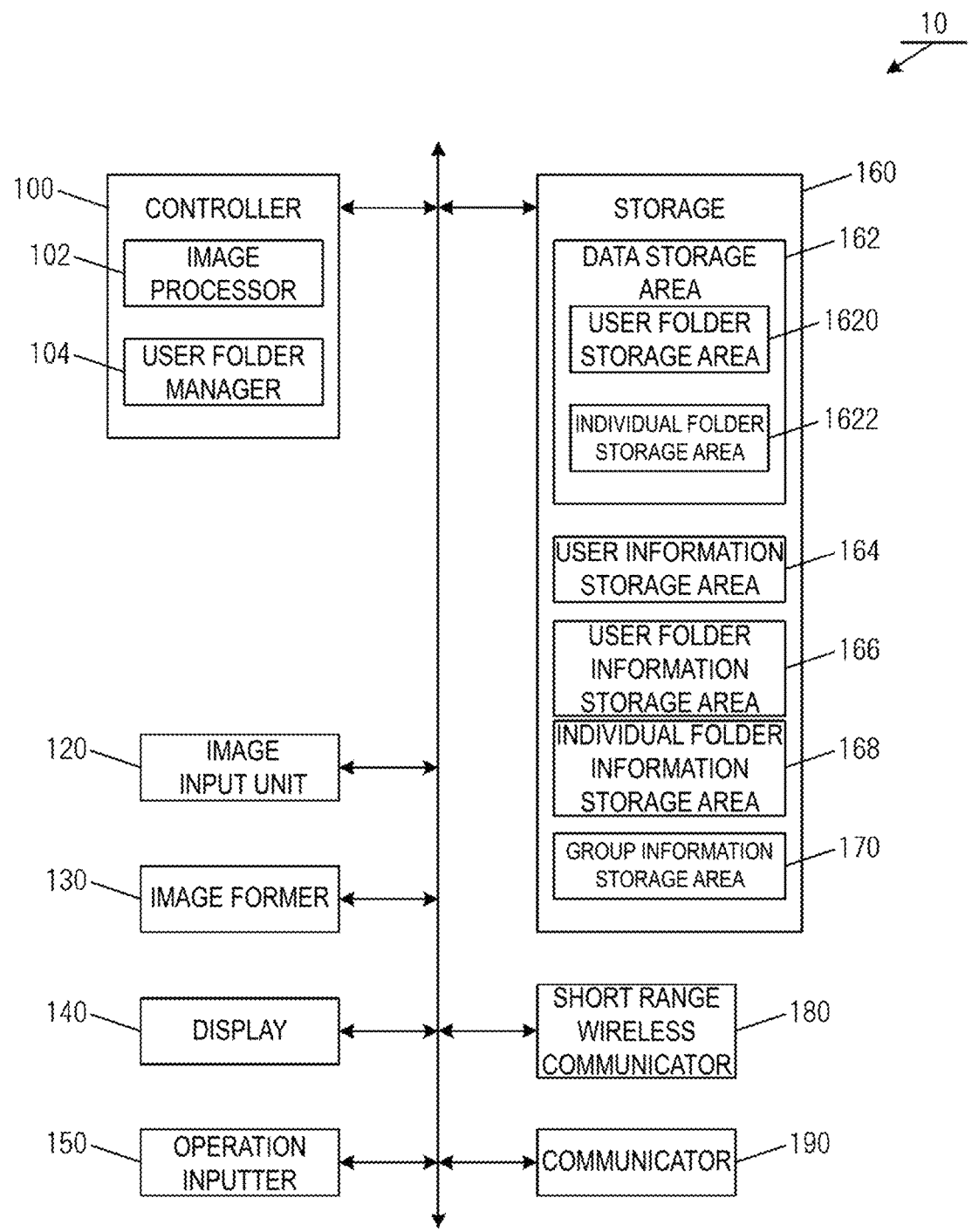
FIG. 2 is a diagram illustrating a functional configuration of an image forming apparatus of the first embodiment.

As illustrated in FIG. 2, the image forming apparatus 10 includes, for example, a controller 100, an image input unit 120, an image former 130, a display 140, an operation inputter 150, a storage 160, a short range wireless communicator 180, and a communicator 190.

The controller 100 controls the entirety of the image forming apparatus 10. The controller 100 realizes various functions by reading and executing various programs stored in the storage 160. The controller 100 is constituted by, for example, one or a plurality of arithmetic devices (such as central processing units (CPUs)). The controller 100 may be configured as a system on a chip (SoC) having a plurality of functions among the functions described below.

The controller 100 functions as an image processor 102 and a user folder manager 104 by executing a program stored in the storage 160. The image processor 102 executes processing related to various images. For example, the image processor 102 executes sharpening processing and tone conversion processing on an image input via the image input unit 120 and the communicator 190. The user folder manager 104 stores a file in a user folder, which will be described below, or deletes a file from the user folder on the basis of a user operation.

The image input unit 120 inputs an image to the image forming apparatus 10. The image input unit 120 may be constituted by, for example, a scanner device that reads a document placed on a platen, an interface (terminal) for reading an image stored in a universal serial bus (USB) memory, or the like. The scanner device is, for example, a device that converts an image into an electric signal using an image sensor such as a charge coupled device (CCD) or a contact image sensor (CIS), and quantizes and encodes the electric signal.

The image former 130 forms (prints) an image on a recording medium such as a recording sheet. The image former 130 may be constituted by, for example, a printing device such as a laser printer using an electrophotographic system. The image former 130, for example, feeds a recording sheet from a sheet feed tray provided in the image forming apparatus 10, forms an image on a surface of the recording sheet, and discharges the recording sheet from a sheet discharge tray provided in the image forming apparatus 10.

The display 140 displays various types of information. The display 140 may be constituted by, for example, display devices such as a liquid crystal display (LCD), an organic electro-luminescence (EL) display, and a micro light emitting diode (LED) display.

The operation inputter 150 receives an operation instruction from a user who uses the image forming apparatus 10. The operation inputter 150 may be constituted by an input device such as a key switch (hard key) or a touch sensor. A system for detecting an input by contact (touch) on the touch sensor may be a general detection system such as a resistive film system, an infrared system, an electromagnetic induction system, or a capacitance system for example. A touch panel in which the display 140 and the operation inputter 150 are integrally formed may be mounted on the image forming apparatus 10.

The storage 160 stores various programs and various types of data necessary for the operation of the image forming apparatus 10. The storage 160 may be constituted by, for example, a storage device (auxiliary storage device) such as a read only memory (ROM), a random access memory (RAN), a solid state drive (SSD) which is a semiconductor memory, or a hard disk drive (HDD).

The storage 160 secures storage areas including a data storage area 162, a user information storage area 164, a user folder information storage area 166, an individual folder information storage area 168, and a group information storage area 170.

The data storage area 162 stores data acquired by the image forming apparatus 10. The data may be, for example, page description language (PDL) data. The PDL data is data including information necessary for forming an image and is, for example, data including a command for printing executable by the image forming apparatus 10. The PDL data is generated by converting a file, or a document or an image created by a user. Note that the data may be an image file, a document file in a portable document format (PDF), or the like. The data may further include information indicating print (output) settings and information (such as a file name, a creation date, and a user name of a user who created the file) of a file converted into PDL data, or such information may be set as an attribute.

The data storage area 162 secures a storage area in which a folder storing data is generated, including a user folder storage area 1620 and an individual folder storage area 1622.

In the user folder storage area 1620, a user folder is secured. The user folder is a folder secured for each user of the image forming apparatus 10. In the individual folder storage area 1622, an individual folder is secured. The individual folder is a folder secured for each apparatus (data transmission source) that has transmitted data to the image forming apparatus 10.

The user information storage area 164 stores information (user information) of a user of the image forming apparatus 10. As illustrated in FIG. 3A, the user information includes a user name (for example, "S117332") that identifies the user and a password (for example, "abc123"). The information that identifies the user may be a user ID or an account name. The user information may further include information such as an e-mail address, a department name, and a contact address.

The user folder information storage area 166 stores information about a user folder (user folder information). As illustrated in FIG. 3B, the user folder information includes a user folder ID (for example, "U0001") that identifies a user folder, a folder name (for example, "Tanaka") of the user folder identified by the user ID, and a user name (for example, "S117332") of a user corresponding to the user folder.

The individual folder information storage area 168 stores information about an individual folder (individual folder information). As illustrated in FIG. 3C, the individual folder information includes an individual folder ID (for example, "F0001") that identifies the individual folder, a folder name (for example, "S117332 PC-10016L") of the individual folder identified by the individual folder ID, apparatus information corresponding to the individual folder, and a password (for example, "abc123") set for the individual folder.

The apparatus information is information of the apparatus corresponding to the individual folder. In other words, the apparatus information corresponds to the individual folder. Therefore, the individual folder is identified by the apparatus information. In the present embodiment, the apparatus information is a user name of the apparatus (for example, "S117332") and a computer name of the apparatus (for example, "PC-10016L").

A password need not be set for the individual folder. When a password is not set for an individual folder, no information may be stored as the password of the individual folder information of the individual folder.

The group information storage area 170 stores information (group information) about a group of individual folders. A group is a unit for designating a plurality of individual folders. As illustrated in FIG. 3D, the group information includes a group ID (for example, "1") that identifies a group, a group name (for example, "group_20220727"), and individual folder IDs (for example, "F0001, F0002") of individual folders belonging to the group.

The short range wireless communicator 180 performs short range wireless communications with another device using a short range wireless communication method. The short range wireless communicator 180 may be constituted by, for example, a communication device including an antenna. The short range wireless communication method (wireless communication system) used by the short range wireless communicator 180 may be any wireless communication method generally used for short range communications, such as Bluetooth (registered trade name), NFC, or ZigBee (registered trade name) for example.

The communicator 190 communicates with another apparatus such as the information processing apparatus 20 or a device via a network such as a local area network (LAN) or a wide area network (WAN). The communicator 190 may be constituted by a communication device or a communication module such as a network interface card (NIC) used in a wired/wireless LAN, for example. Note that the communicator 190 may include an interface (network I/F) connectable to a network.

1.2.2 Information Processing Apparatus

Figure 4:
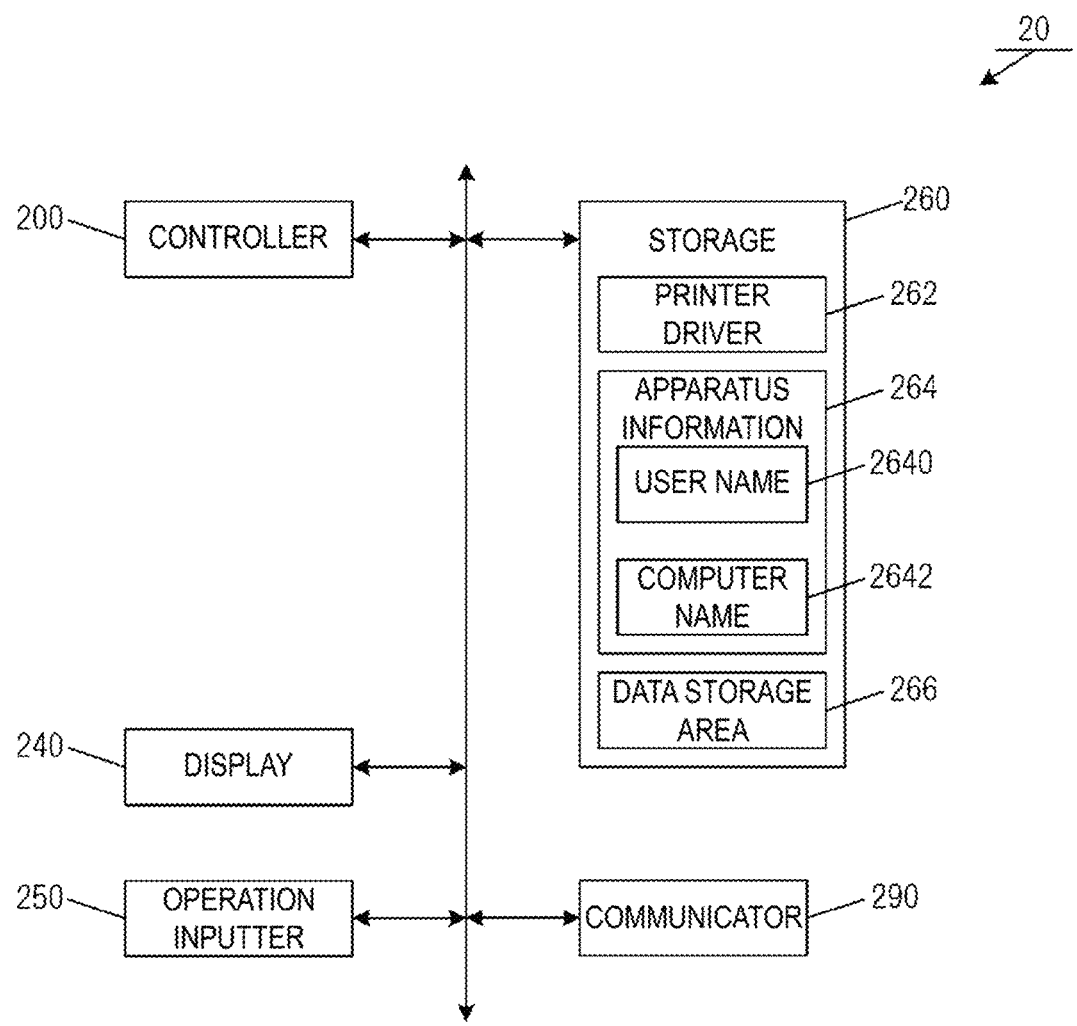
FIG. 4 is a diagram illustrating a functional configuration of an information processing apparatus of the first embodiment.

As illustrated in FIG. 4, the information processing apparatus 20 includes, for example, a controller 200, a display 240, an operation inputter 250, a storage 260, and a communicator 290.

The controller 200 is a functional unit for controlling the entirety of the information processing apparatus 20. The controller 200 realizes various functions by reading and executing various programs stored in the storage 260. The controller 200 may be constituted by the same arithmetic device as the controller 100 or may be configured as an SoC.

The display 240 displays various types of information. The display 240 may be constituted by the same display device as the display 140. The operation inputter 250 receives an operation instruction from a user who uses the information processing apparatus 20. The operation inputter 250 may be constituted by the same display device as the operation inputter 150. A touch panel in which the display 240 and the operation inputter 250 are integrally formed may be mounted on the information processing apparatus 20. The operation inputter 250 may be configured as an interface connectable to an input device such as a keyboard or a mouse.

The storage 260 stores various programs and various types of data necessary for the operation of the information processing apparatus 20. The storage 260 may be constituted by the same storage device as the storage 160.

The storage 260 stores a printer driver 262 and apparatus information 264. The printer driver 262 causes the controller 200 to realize a function of displaying a job setting screen and a function of transmitting data to another apparatus. The apparatus information 264 is apparatus information of the information processing apparatus 20. The apparatus information 264 includes a user name 2640 and a computer name 2642 of the information processing apparatus 20. The apparatus information 264 is set in advance by the user, for example.

The storage 260 secures a data storage area 266 as a storage area for storing data. The data stored in the data storage area 266 may be a file on the basis of content such as text and images. Further, the data may be print data (PDL data) generated from a file. When the data is output (for example, when the user wants to print the data), the controller 200 may transmit the data to the image forming apparatus 10.

The communicator 290 communicates with another apparatus such as the image forming apparatus 10 or a device via a network such as a LAN or a WAN. The communicator 290 may be constituted by the same communication device or communication module as the communicator 190.

1.2.3 Terminal Apparatus

Figure 5:
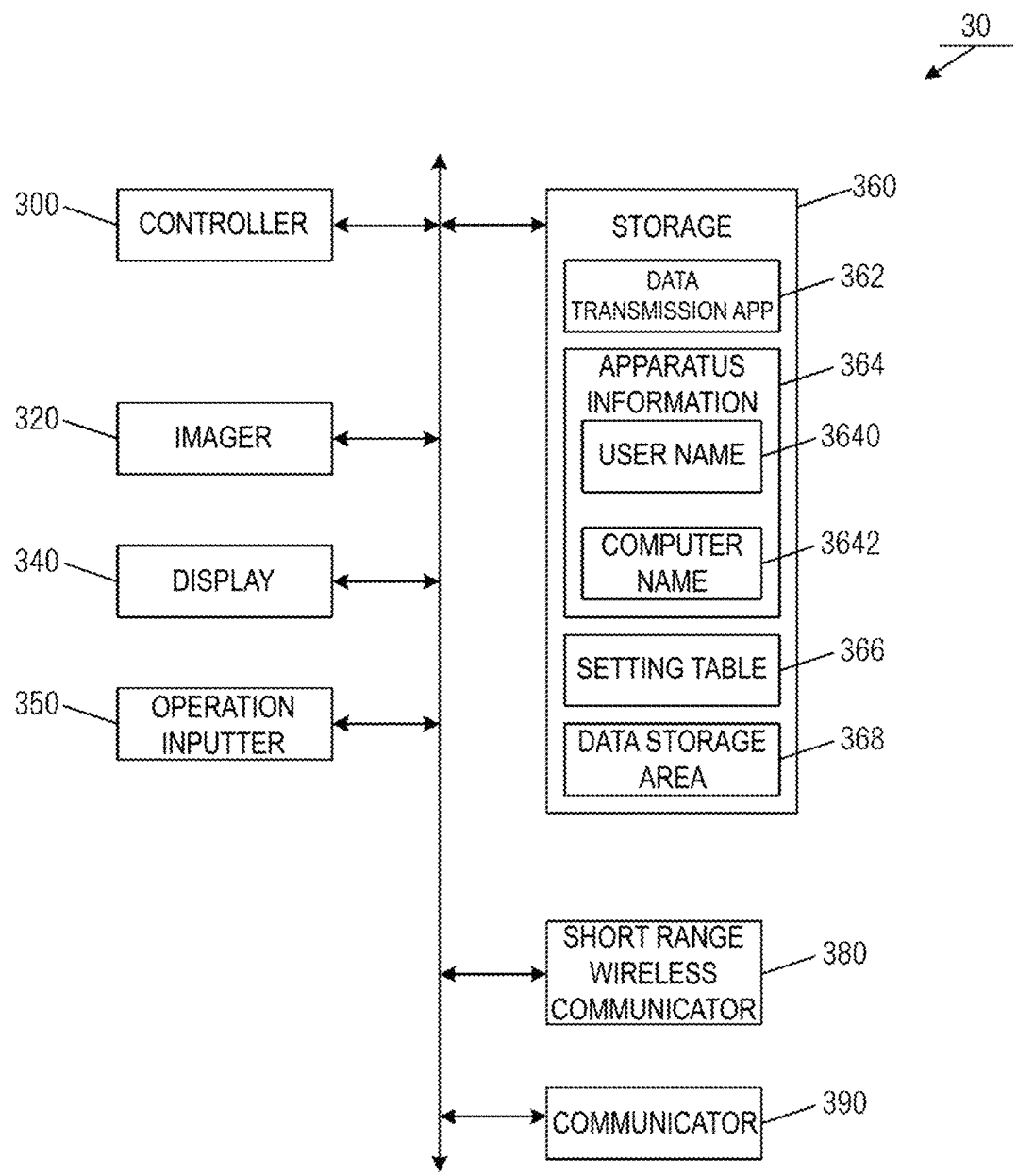
FIG. 5 is a diagram illustrating a functional configuration of a terminal apparatus of the first embodiment.

As illustrated in FIG. 5, the terminal apparatus 30 includes, for example, a controller 300, an imager 320, a display 340, an operation inputter 350, a storage 360, a short range wireless communicator 380, and a communicator 390.

The controller 300 is a functional unit for controlling the entire terminal apparatus 30. The controller 300 realizes various functions by reading and executing various programs stored in the storage 360. The controller 300 may be constituted by the same arithmetic device as the controller 100 or may be configured as an SoC.

The imager 320 captures an image and inputs the captured image. The imager 320 may be constituted by, for example, an image capturing device such as a camera.

The display 340 displays various types of information. The display 340 may be constituted by the same display device as the display 240. The operation inputter 350 receives an operation instruction from a user who uses the terminal apparatus 30. The operation inputter 350 may be constituted by the same display device as the display 340. A touch panel in which the display 340 and the operation inputter 350 are integrally formed may be mounted on the terminal apparatus 30.

The storage 360 stores various programs and various types of data necessary for the operation of the terminal apparatus 30. The storage 360 may be constituted by the same storage device as the storage 160.

The storage 360 also stores a data transmission application 362, apparatus information 364, and a setting table 366. The data transmission application 362 is an application that causes the controller 300 to realize a function of transmitting data to another apparatus. The data transmission application 362 may cause the controller 300 to realize a function of receiving data or a file to be transmitted or displaying a setting screen of a job to be executed in the image forming apparatus 10. The apparatus information 364 is apparatus information of the terminal apparatus 30. The apparatus information 364 includes a user name 3640 and a computer name 3642 of the terminal apparatus 30. The apparatus information 364 is set in advance by the user, for example.

The setting table 366 is a table that stores contents set in the terminal apparatus 30. As illustrated in FIG. 6, the setting table 366 is a table in which, for example, a setting item name (for example, "perform linking") and a setting value (for example, "Yes") for the setting item name are stored in association with each other.

The setting table 366 stores information (folder identification information) that identifies a folder as a transmission destination of data to be transmitted to the image forming apparatus 10. The folder identification information is information enabling identification of a folder generated in the image forming apparatus 10. The folder identification information is, for example, apparatus information or a folder ID (an individual folder ID or a user folder ID). In the present embodiment, for example, as indicated by D100 in FIG. 6, a user name and a computer name of another apparatus (for example, PC) are stored as the folder identification information.

The storage 360 secures a data storage area 368 as a storage area for storing data. The data stored in the data storage area 368 may be a file on the basis of content such as text and images. The data may be an image on the basis of a photograph taken by the terminal apparatus 30 using a camera device. Further, the data may be print data (PDL data) generated from a file. When the data is output (for example, when the user wants to print the data), the controller 300 may transmit the data to the image forming apparatus 10.

The short range wireless communicator 380 performs short range wireless communication with another device using a short range wireless communication method. The short range wireless communicator 380 may be constituted by the same communication device or communication module as the short range wireless communicator 180.

The communicator 390 communicates with another apparatus such as the image forming apparatus 10 or a device via a network such as a LAN or a WAN. The communicator 390 may be constituted by the same communication device or communication module as the communicator 190.

1.3 Processing Flow 1.3.1 Overview of Processing Flow

Figure 7:
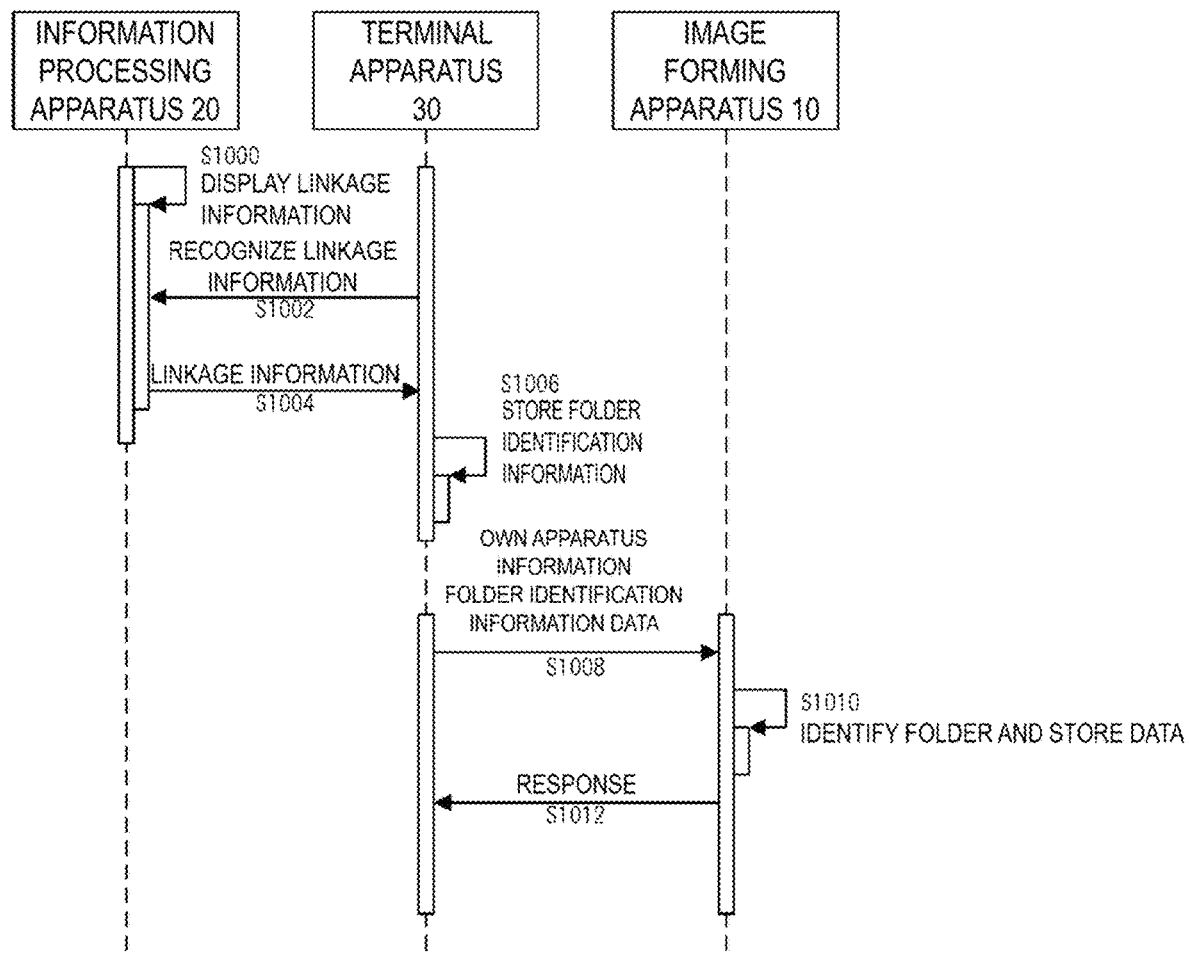
FIG. 7 is a sequence diagram illustrating an overview of processing of the first embodiment.

FIG. 7 is a sequence diagram illustrating an overview of processing in which data transmitted from the terminal apparatus 30 to the image forming apparatus 10 is stored in an individual folder of the information processing apparatus 20. The individual folder of the information processing apparatus 20 is an individual folder generated as a result of transmitting data from the information processing apparatus 20 to the image forming apparatus 10.

First, the information processing apparatus 20 displays linkage information on the display 240 (S1000). The linkage information is information used for an apparatus (for example, the terminal apparatus 30) that transmits data to the image forming apparatus 10 to link with an apparatus (for example, the information processing apparatus 20) different from the apparatus or a folder (an individual folder or a user folder) generated in the image forming apparatus 10. By linking with another apparatus or a folder generated in the image forming apparatus 10, the apparatus that transmits data to the image forming apparatus 10 can transmit data to an individual folder of the other apparatus or the linked individual folder.

The linkage information includes at least the folder identification information. In the present embodiment, the information processing apparatus 20 displays the linkage information including the apparatus information 264 of the information processing apparatus 20 as the folder identification information. The linkage information may be represented as an image (identification code) indicating information encoded by a predetermined method. For example, the linkage information may be represented by a two-dimensional code such as a QR code (registered trade name), MaxiCode, or PDF417, as an identification code. Hereinafter, a QR code will be described as an example in the present embodiment.

The terminal apparatus 30 acquires the image displayed on the display 240 by using the imager 320, and recognizes the linkage information displayed on the display 240 (S1002). Thus, the terminal apparatus 30 acquires the linkage information from the information processing apparatus 20 (S1004). The terminal apparatus 30 stores the folder identification information included in the acquired linkage information (S1006). Thus, the terminal apparatus 30 can be linked to the information processing apparatus 20 before transmitting data to the image forming apparatus 10 (PC-mobile pre-linking). Thus, the terminal apparatus 30 and the information processing apparatus 20 share information about the individual folder.

Subsequently, the terminal apparatus 30 transmits the folder identification information stored in the S1006 to the image forming apparatus 10 together with the data and the apparatus information 364 of the terminal apparatus 30 (S1008). When the image forming apparatus 10 receives the folder identification information from the terminal apparatus 30, the image forming apparatus 10 identifies a folder on the basis of the folder identification information and stores the data received from the terminal apparatus 30 in the folder identified (S1010). After storing the data, the image forming apparatus 10 may transmit a response to the terminal apparatus 30, indicating that the data is stored (S1012). After receiving the response, the terminal apparatus 30 may display a message indicating that the data is stored.

1.3.2 Processing by Information Processing Apparatus

Figure 8:
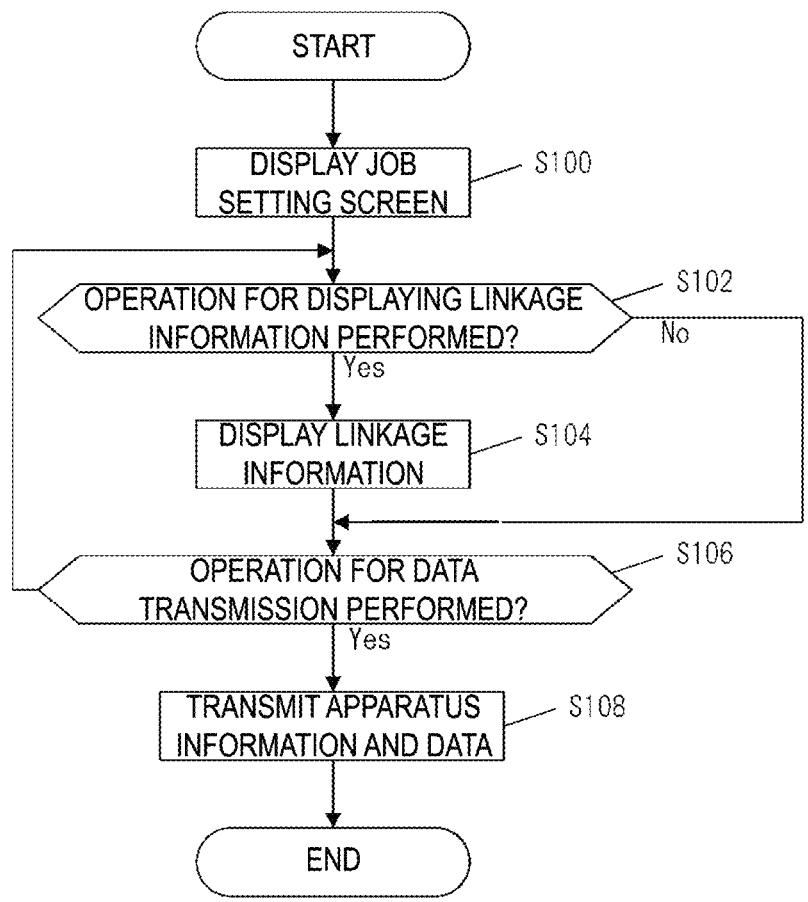
FIG. 8 is a diagram illustrating processing executed by the information processing apparatus of the first embodiment.

FIG. 8 is a diagram illustrating processing executed by the information processing apparatus 20. The processing illustrated in FIG. 8 is executed when the controller 200 reads the printer driver 262 on the basis of a user operation.

The controller 200 displays a job setting screen (step S100). The job setting screen may include a user interface (UI) for setting a job to be executed by the image forming apparatus 10 and a UI (for example, a button) for displaying the linkage information.

When the user performs an operation of displaying the linkage information (Yes in step S102, the processing proceeds to step S104), the controller 200 displays the linkage information. For example, when the button for displaying the linkage information is selected, the controller 200 determines that the operation for displaying the linkage information is performed, and displays the QR code indicating the apparatus information of the information processing apparatus 20 on the display 240 as the linkage information. Here, the apparatus information of the information processing apparatus 20 is the folder identification information. Therefore, by recognizing the QR code, the apparatus can acquire information identifying the individual folder of the information processing apparatus 20. The controller 200 may set the linkage information to include the folder name of the individual folder of the information processing apparatus 20, whether the password of the individual folder has been set, information obtained by encrypting the password of the individual folder (for example, a hash value of the password), and the like. Upon determining that the operation of displaying the linkage information is not performed (No in step S102), the controller 200 omits step S104. When the individual folder of the information processing apparatus 20 is not generated in the image forming apparatus 10, the controller 200 may disable the user operation for displaying the linkage information. In this way, the controller 200 can acquire the linkage information only when the individual folder of the information processing apparatus 20 is generated.

Subsequently, when the user performs an operation to transmit data to the image forming apparatus 10, the controller 200 transmits the apparatus information and data of the information processing apparatus 20 to the image forming apparatus 10 (Yes in step S106, the processing proceeds to step S108). For example, the controller 200 transmits PDL data the content (text or image) of which is edited by the user, or a file selected by the user, as the data to the image forming apparatus 10. The controller 200 may transmit information indicating the job setting to the image forming apparatus 10. When the controller 200 determines that the operation for the data transmission to the image forming apparatus 10 is not performed, the processing returns to step S102 (No in step S106, the processing proceeds to step S102).

1.3.3 Processing by Terminal Apparatus

Figure 9:
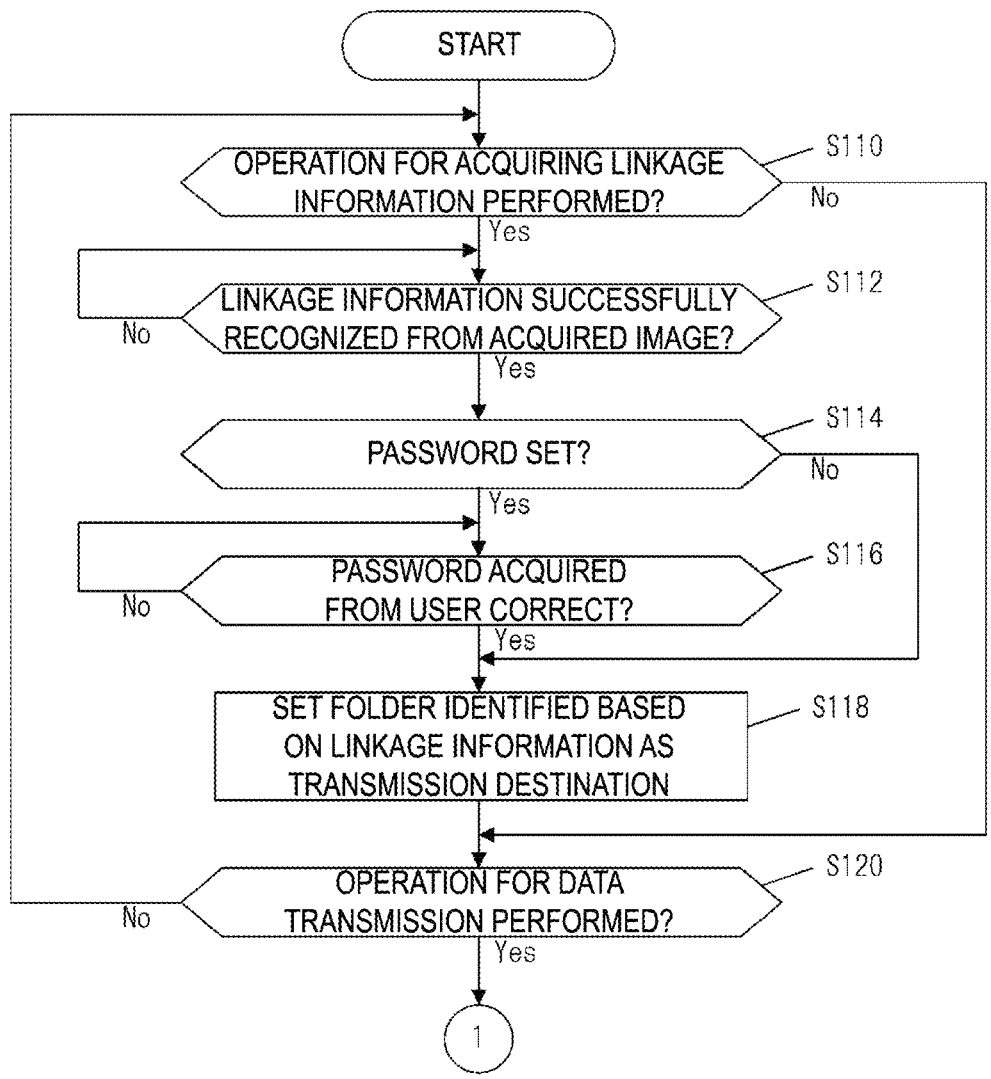
FIG. 9 is a diagram illustrating processing executed by the terminal apparatus of the first embodiment.
Figure 10:
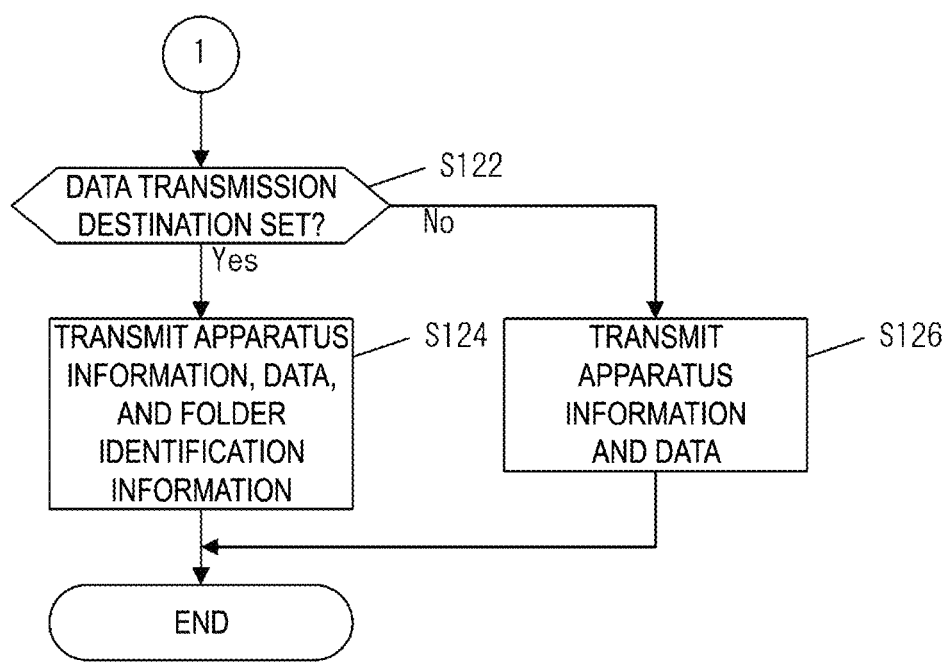
FIG. 10 is a diagram illustrating processing executed by the terminal apparatus of the first embodiment.

FIG. 9 and FIG. 10 are diagrams illustrating processing executed by the terminal apparatus 30. The processing illustrated in FIG. 9 and FIG. 10 is executed when the controller 300 reads the data transmission application 362 and a screen for transmitting data (data transmission screen) is displayed on the display 340 on the basis of a user operation. The terminal apparatus 30 is assumed to have acquired information necessary for communications with the image forming apparatus 10 in advance and thus is assumed to be in a state of being capable of communicating with the image forming apparatus 10.

The controller 300 determines whether an operation for acquiring linkage information has been performed (step S110). For example, the controller 300 displays a UI (for example, a button) for acquiring the linkage information on the data transmission screen, and determines that the operation for acquiring the linkage information is performed when an operation of selecting the UI is performed by the user.

When the operation for acquiring the linkage information is performed, the controller 300 acquires an image via the imager 320 and determines whether the linkage information is successfully recognized from the image (step S112). When the linkage information fails to be recognized, the controller 300 repeats the processing of step S112 (No in step S112). On the other hand, when the linkage information is successfully recognized, the controller 300 determines whether a password is set for the individual folder identified on the basis of the linkage information (Yes in step S112, the processing proceeds to step S114). For example, when the linkage information includes information indicating that the password is set for the individual folder, the controller 300 determines that the password is set.

When the password is set, the controller 300 acquires a password from the user and determines whether the password is correct (Yes in step S114, the processing proceeds to step S116). For example, when the information obtained by encrypting the password acquired from the user matches the information obtained by encrypting the password of the individual folder included in the linkage information, the controller 300 determines that the password acquired from the user is correct. When the password acquired from the user is incorrect, the controller 300 repeats the processing of step S116 (No in step S116). When the password is not set, the processing of step S116 is omitted (No step S114).

Subsequently, the controller 300 sets as a data transmission destination, the folder identified on the basis of the linkage information (step S118). For example, the controller 300 stores the folder identification information included in the linkage information recognized in step S112, in the setting table 366. In the present embodiment, since the apparatus information is included as the folder identification information, the controller 300 sets the individual folder identified by the apparatus information included in the linkage information as the data transmission destination. The controller 300 may store, in the setting table 366, information of the individual folder (for example, a folder name) or information indicating that the individual folder is linked to a folder generated in another apparatus or the image forming apparatus 10.

Upon determining in step S110 that the operation of acquiring the linkage information is not performed (No in step S110), the controller 300 omits the processing from step S112 to step S118.

Subsequently, the controller 300 determines whether an operation for data transmission has been performed (step S120). When the operation for data transmission is not performed, the controller 300 returns to step S110 (No in step S120, the processing proceeds to step S110). On the other hand, when the operation for data transmission is performed, the controller 300 determines whether the data transmission destination is set (Yes in step S120, the processing proceeds to step S122). For example, when the folder identification information is stored in the setting table 366, the controller 300 determines that the data transmission destination is set.

When the data transmission destination is set, the controller 300 transmits the apparatus information 364 of the terminal apparatus 30, the data, and the folder identification information stored in the setting table 366 to the image forming apparatus 10 (Yes in step S122, the processing proceeds to step S124). Accordingly, the controller 300 can transmit the data to the folder (in the present embodiment, an individual folder) identified on the basis of the folder identification information included in the linkage information.

On the other hand, when the data transmission destination is not set, the controller 300 transmits the apparatus information 364 of the terminal apparatus 30 and the data transmission destination to the image forming apparatus 10 (No in step S122, the processing proceeds to step S126). Accordingly, the controller 300 can transmit the data to the individual folder identified on the basis of the apparatus information of the terminal apparatus 30. Here, the controller 300 transmits, as data, a file selected by the user (such as, for example, text, an image, and PDF as content) to the image forming apparatus 10. Further, the controller 300 may generate and transmit PDL data corresponding to the file.

1.3.4 Image Forming Apparatus

Main Processing

Figure 11:
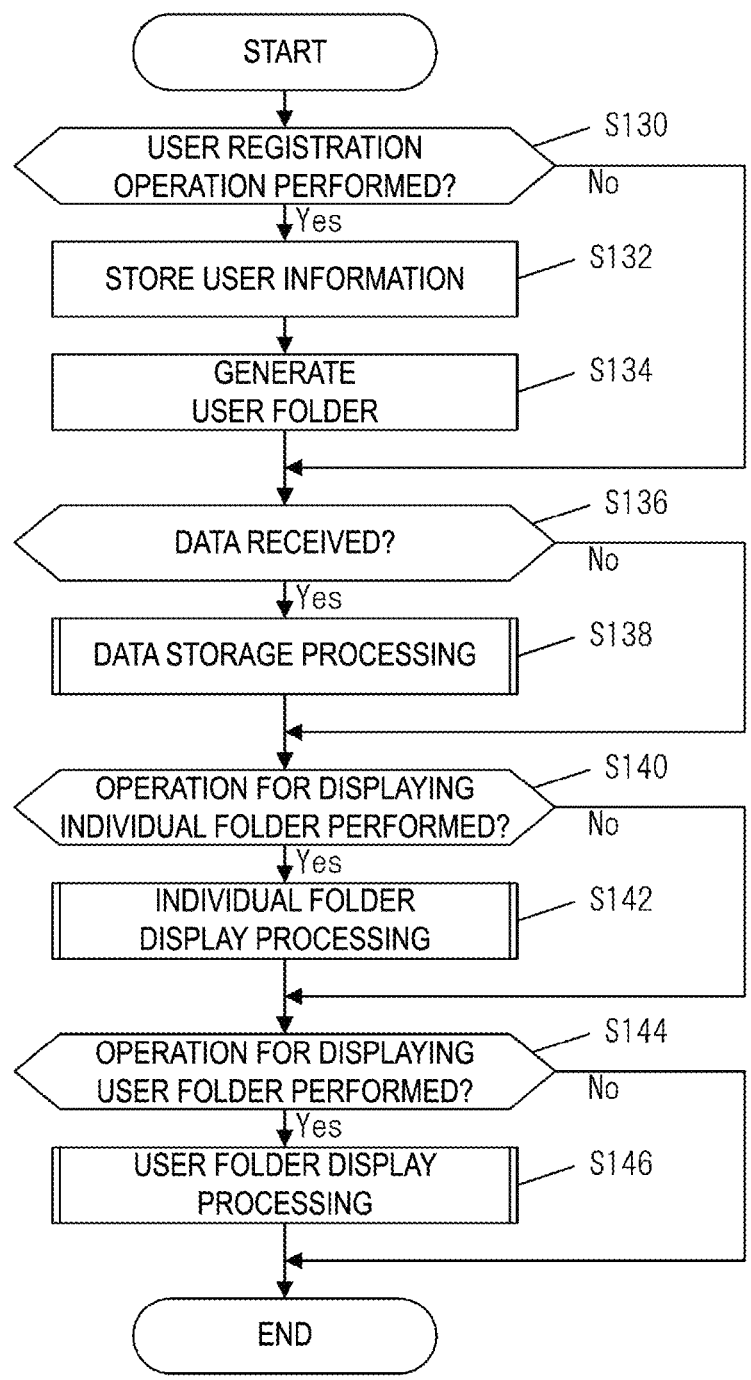
FIG. 11 is a diagram illustrating processing executed by the image forming apparatus of the first embodiment.

FIG. 11 is a diagram illustrating processing executed by the image forming apparatus 10. When the operation of registering the user is performed, the controller 100 stores the user information on the basis of the operation of the user (Yes in step S130, the processing proceeds to step S132). For example, the controller 100 displays a screen for inputting user information on the display 140, and stores the user information input by the user in the user information storage area 164. Further, the controller 100 determines the user folder ID and the folder name of the user folder to be generated, and generates the user folder in the user folder storage area 1620 (step S134). The controller 100 may determine the folder name from information included in the user information, or may make the user input the folder name. In this case, the controller 100 stores the user folder information including the user folder ID and the folder name of the generated user folder as well as the user name of the user corresponding to the user folder, in the user folder information storage area 166. Upon determining that the operation of registering the user is not performed, the controller 100 omits step S132 and step S134 (No in step S130).

Subsequently, when the controller 100 receives data from another device, the controller 100 executes processing of storing the received data (data storage processing) (Yes in step S136, the processing proceeds to step S138). The data storage processing will be described below. When no data is received from another apparatus, the controller 100 omits the processing in step S138 (No in step S136).

Subsequently, when an operation for displaying an individual folder is performed, the controller 100 executes processing of displaying an individual folder (individual folder display processing) (Yes in step S140, the processing proceeds to step S142). The individual folder display processing will be described below. When the operation of displaying the individual folder is not performed, the controller 100 omits the processing in step S142 (No in step S140).

Subsequently, in a case where an operation for displaying a user folder is performed, the controller 100 executes processing for displaying a user folder (user folder display processing) (Yes in step S144, the processing proceeds to step S146). The user folder display processing will be described below. When the operation for displaying the user folder is not performed, the controller 100 omits the processing of step S146 (No in step S144).

Data Storage Processing

Figure 12:
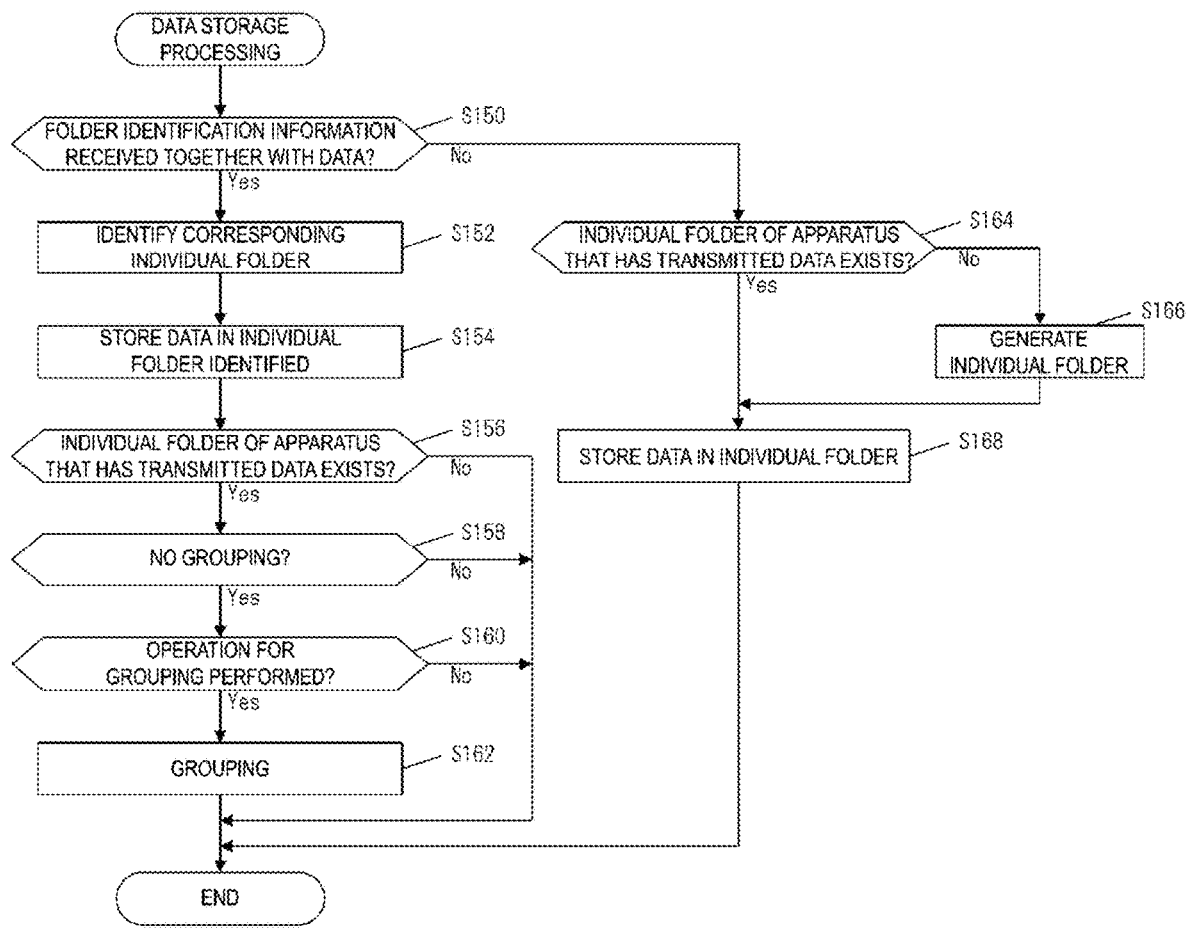
FIG. 12 is a diagram illustrating a flow of data storage processing of the first embodiment.

FIG. 12 is a diagram illustrating a flow of data storage processing. First, the controller 100 determines whether the folder identification information is received together with the data (step S150).

Upon determining that the folder identification information is received together with the data, the controller 100 identifies the individual folder (first individual folder) corresponding to the folder identification information (Yes in step S150, the processing proceeds to step S152). In the present embodiment, the controller 100 receives the apparatus information as the folder identification information. Therefore, the controller 100 identifies the individual folder corresponding to the individual folder information including the same apparatus information as the received apparatus information, as the individual folder corresponding to the folder identification information. Further, the controller 100 stores the data received in step S136 in FIG. 11 in the individual folder identified (step S154).

Subsequently, the controller 100 determines whether there is an individual folder (second individual folder) of the apparatus that transmitted the data (step S156). Here, as described in step S124 and step S126 in FIG. 10, the apparatus that transmitted the data (for example, the terminal apparatus 30) has transmitted its apparatus information. Therefore, for example, the controller 100 identifies the individual folder corresponding to the individual folder information including the same apparatus information as the apparatus information of the apparatus that has transmitted the data, as the individual folder of the apparatus that has transmitted the data. When the controller 100 can identify the individual folder of the apparatus that has transmitted the data, the controller 100 determines that the individual folder of the apparatus that has transmitted the data exists.

When the individual folder of the apparatus that has transmitted the data exists, it is determined whether the two individual folders that are the individual folder and the individual folder identified in step S152 are grouped (integrated) (Yes in step S156, the processing proceeds to step S158). For example, when group information including the individual folder ID of the individual folder of the apparatus that has transmitted the data and the individual folder ID of the individual folder identified in step S152 is stored, the controller 100 determines that two individual folders are grouped.

When the two individual folders are not grouped, the controller 100 asks the user whether they want the two individual folders to be grouped, and determines whether an operation for the grouping is performed (Yes in step S158, the processing proceeds to step S160). For example, the controller 100 displays the folder name or user name of the individual folder of the apparatus that has transmitted the data, and the folder name or user name of the individual folder identified by the folder identification information, and displays a button for selecting whether to group the two individual folders.

When the grouping operation is performed by the user, the controller 100 groups the two individual folders (Yes in step S160, the processing proceeds to step S162). For example, the controller 100 determines a group ID and a group name, and stores group information including the group ID, the group name, and the folder IDs of two individual folders to be grouped, in the group information storage area 170. Here, the controller 100 determines the group name on the basis of the date or the like. As a result, when an individual folder has already been generated with the information of the apparatus that has transmitted the data, the controller 100 can group the individual folder of the apparatus that has transmitted the data and the folder identified by the folder identification information.

Note that the controller 100 omits the processing of step S162 when there is no individual folder of the apparatus that has transmitted the data (No in step S156), when grouping has already been performed (No in step S158), or when the grouping operation is not performed (No in step S160).

Upon determining in step S150 that the folder identification information is not received together with the data, the controller 100 determines whether there is an individual folder of the apparatus that has transmitted the data (No in step S150, the processing proceeds to step S164). The processing of step S164 is the same as that of step S156.

When the individual folder of the device that has transmitted the data transmission does not exist, the controller 100 generates the individual folder of the apparatus that has transmitted the data on the basis of the apparatus information of the apparatus that has transmitted the data (No in step S164, the processing proceeds to Step S166). For example, the controller 100 determines the folder name of the individual folder from the apparatus information of the apparatus that has transmitted the data (for example, a folder name obtained by combining the user name and the computer name), and generates the individual folder provided with the folder name. In addition, the controller 100 determines the individual folder ID, and stores the individual folder information including the individual folder ID, the folder name of the generated individual folder, and the apparatus information of the apparatus that has transmitted the data, in the individual folder information storage area 168. When there is the individual folder of the apparatus that has transmitted the data, the controller 100 omits the processing of step S166 (Yes in step S164).

Subsequently, the controller 100 stores the data received in step S136 in FIG. 11 in the individual folder of the apparatus that has transmitted the data (step S168).

Individual Folder Display Processing

Figure 13:
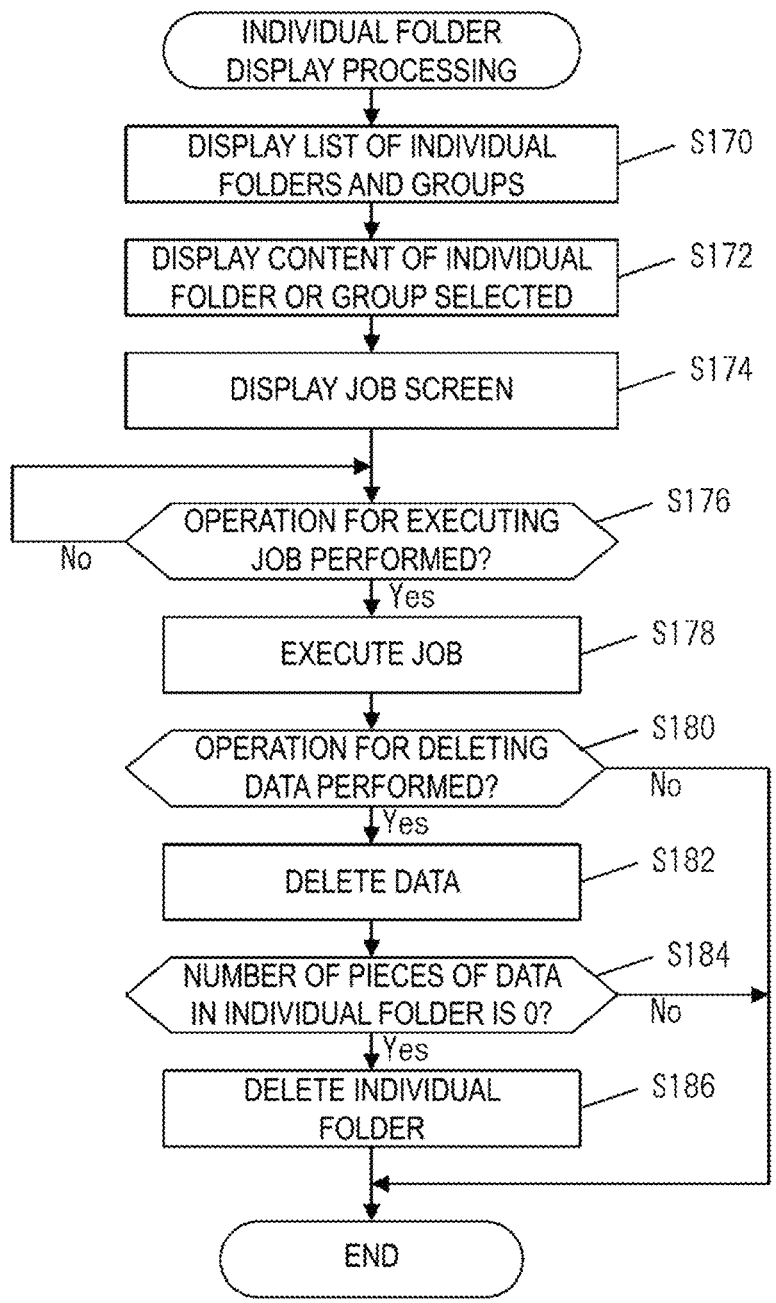
FIG. 13 is a diagram illustrating a flow of individual folder display processing of the first embodiment.

FIG. 13 is a flowchart illustrating a flow of the individual folder display processing. First, the controller 100 displays a list of individual folders and groups (step S170). For example, the controller 100 displays the folder name included in the individual folder information stored in the individual folder information storage area 168 and the group name included in the group information stored in the group information storage area 170, on the display 140 in a selectable manner. Note that the controller 100 may display the individual folder and the group differently.

Subsequently, the controller 100 displays the contents of the individual folder or group selected by the user (step S172). For example, when an individual folder is selected, the controller 100 displays data stored in the selected individual folder in a selectable manner. On the other hand, when a group is selected, the controller 100 displays data stored in an individual folder belonging to the selected group in a selectable manner.

Next, when the user selects data, the controller 100 displays a screen of a job that outputs the selected data (step S174). The screen of the job that outputs the data may be, for example, a screen of a print job for outputting the data by forming an image on the basis of the data, or a screen of a job for transmitting the data to another apparatus.

Subsequently, when an operation for executing a job is performed by the user, the controller 100 executes the job (Yes in step S176, the processing proceeds to step S178). On the other hand, when the operation for executing a job is not performed, the controller 100 repeats the processing of step S176 (No in step S176).

Subsequently, when the user performs an operation to delete data, the controller 100 deletes the data (Yes in step S180, the processing proceeds to step S182). Further, when, as a result of deleting data, the number of pieces of data stored in the individual folder storing the data becomes 0, that is, when the individual folder becomes empty, the controller 100 deletes the individual folder (Yes in step S184, the processing proceeds to step S186). For example, the controller 100 deletes the individual folder in which the number of pieces of data is reduced to 0 from the individual folder storage area 1622. The controller 100 deletes the individual folder information of the deleted individual folder from the individual folder information storage area 168.

When the number of data pieces stored in the individual folder is not 0, the controller 100 omits the processing of step S186 (No in step S184). Upon determining in step S180 that the data deleting operation is not performed, the controller 100 omits the processing from step S182 to step S186 (No in step S180).

User Folder Display Processing

Figure 14:
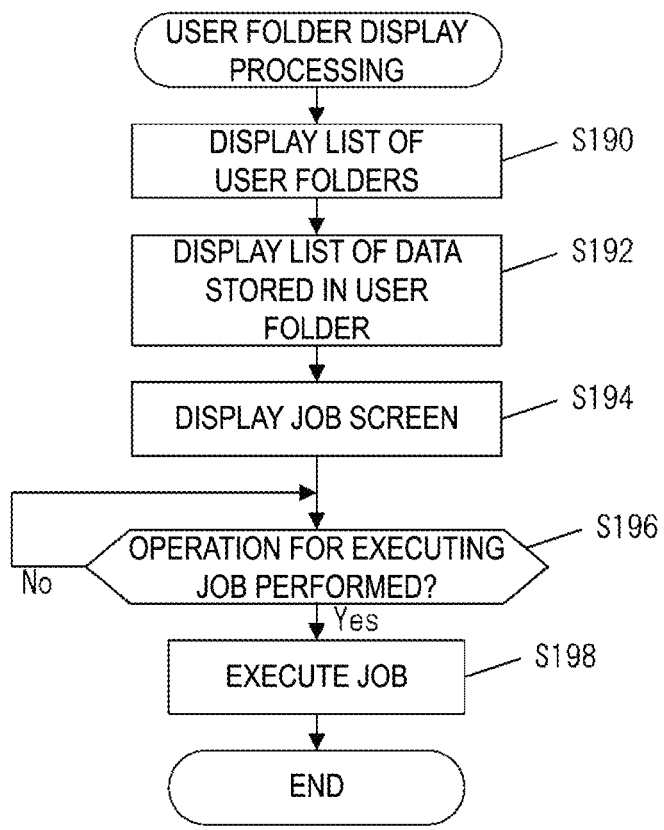
FIG. 14 is a diagram illustrating a flow of user folder display processing of the first embodiment.

FIG. 14 is a flowchart illustrating a flow of the user folder display processing. First, the controller 100 displays a list of user folders (step S190). For example, the controller 100 displays, on the display 140 and in a selectable manner, the folder name included in the user folder information stored in the user folder information storage area 166.

Subsequently, the controller 100 displays, in a selectable manner, a list of data stored in the user folder selected by the user (step S192), and displays a screen of a job that outputs the data selected by the user (step S194). When an operation for executing a job is performed by the user, the controller 100 executes the job (Yes in step S196, the processing proceeds to step S198). On the other hand, when the operation for executing a job is not performed, the controller 100 repeats the processing of step S196 (No in step S196).

1.4 Operation Example

FIGS. 15A to 17C are diagrams illustrating an operation example of the present embodiment. In the description of the operation example, a case will be described where an apparatus that transmits data to the image forming apparatus 10 is the terminal apparatus 30, and the terminal apparatus 30 is linked to the information processing apparatus 20.

Figure 15A:
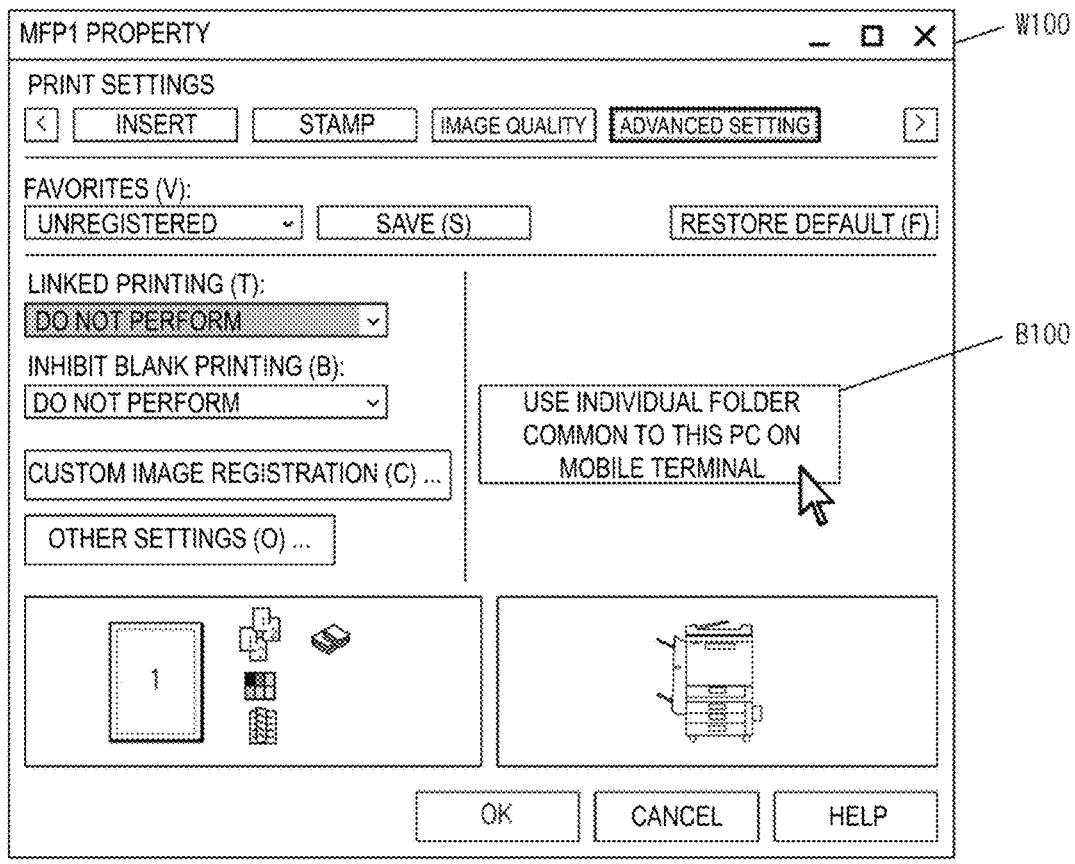
FIGS. 15A and 15B are diagrams illustrating an operation example of the first embodiment.
Figure 15B:
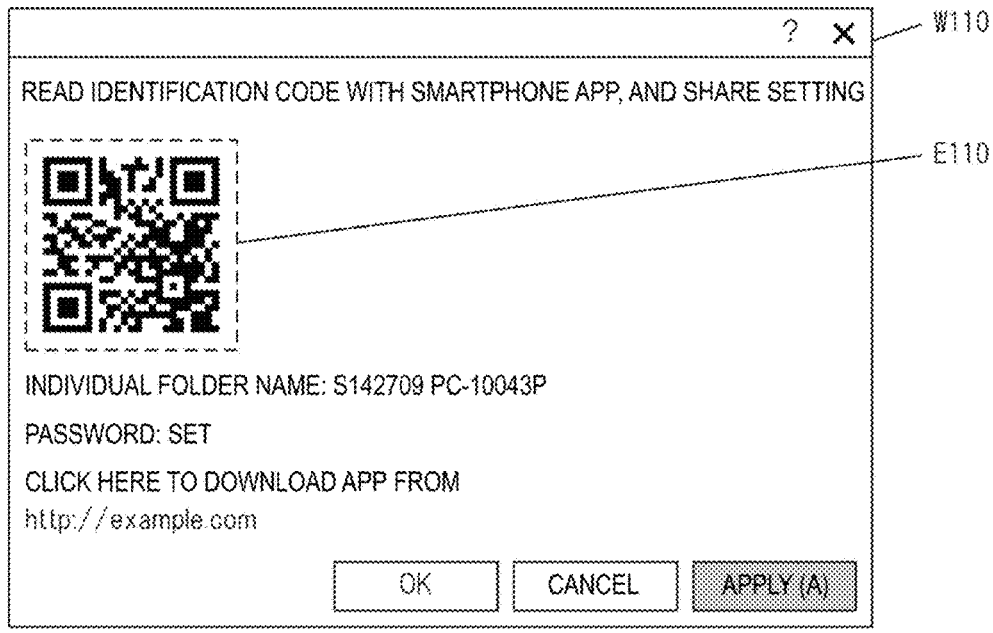

FIGS. 15A and 15B are diagrams illustrating a screen example of a screen displayed on the display 240 of the information processing apparatus 20. FIG. 15A is a screen example of a job setting screen W100. The setting screen W100 is provided with a button B100 with a description "use individual folder common to this PC on mobile terminal" as a button for displaying the linkage information. FIG. 15B is a screen example of a screen W110 displayed when the button B100 is selected. In an area E110 of the screen W110, the linkage information including the apparatus information of the information processing apparatus 20 is displayed as a two dimensional code.

Figure 16A:
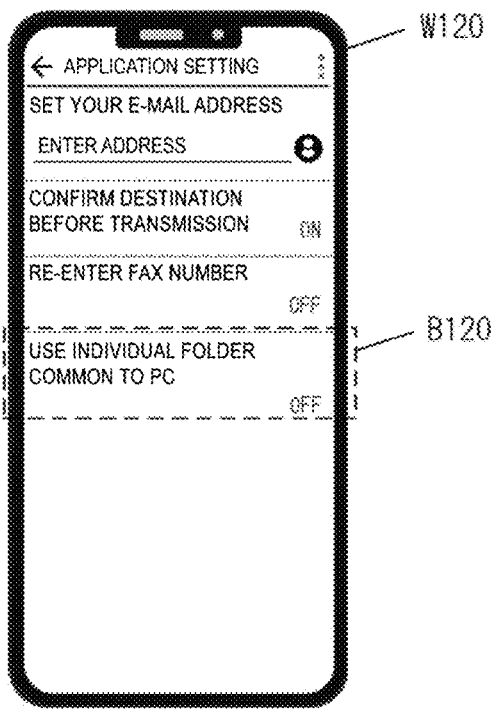
FIGS. 16A to 16D are diagrams illustrating an operation example of the first embodiment.
Figure 16B:
Figure 16C:
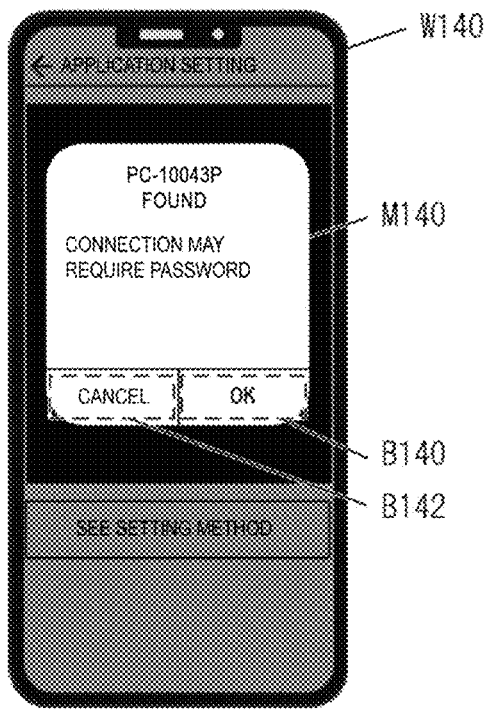

FIGS. 16A to 16D are diagrams illustrating a screen example of a screen displayed on the display 340 of the terminal apparatus 30. FIG. 16A is a diagram illustrating a screen example of a data transmission screen W120. The data transmission screen W120 includes a button B120 for acquiring linkage information. FIG. 16B is a screen example of a screen W130 displayed when the button B120 is selected. The image acquired by the imager 320 is displayed on the screen W130, and the linkage information included in the image is recognized. When the linkage information is recognized, as illustrated in FIG. 16C, a screen W140 including a message M140 that asks the user whether to link with a folder generated in another apparatus or the image forming apparatus 10 may be displayed. Further, the message M140 may include a button B140 instructing that linking be performed and a button B142 instructing that linking not be performed. In this case, linking or cancellation of the linking may be performed in accordance with the selected button. In addition, when the linking is performed and a password is set for an individual folder identified on the basis of the linkage information acquired from another apparatus, the user may be requested to input the password.

Figure 16D:
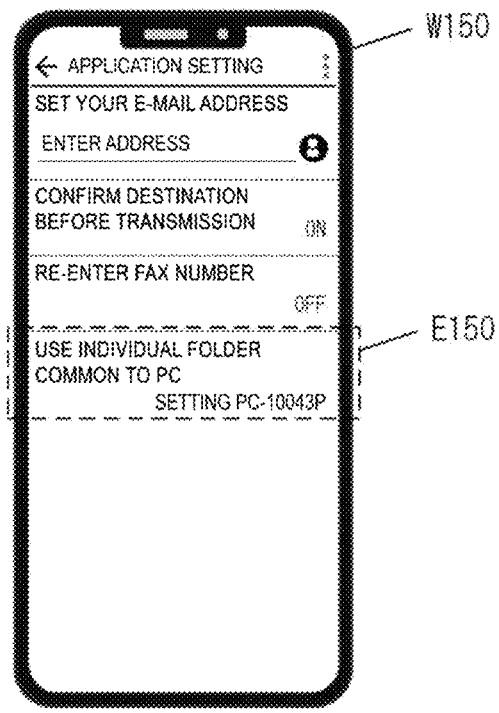

FIG. 16D is a diagram illustrating a screen example of a screen W150 displayed after the linking with another apparatus has been performed. In an area E150 of the screen W150, information (for example, a computer name) of a linked apparatus (for example, the information processing apparatus 20) and a folder name of an individual folder of the linked apparatus are displayed.

Figure 17A:
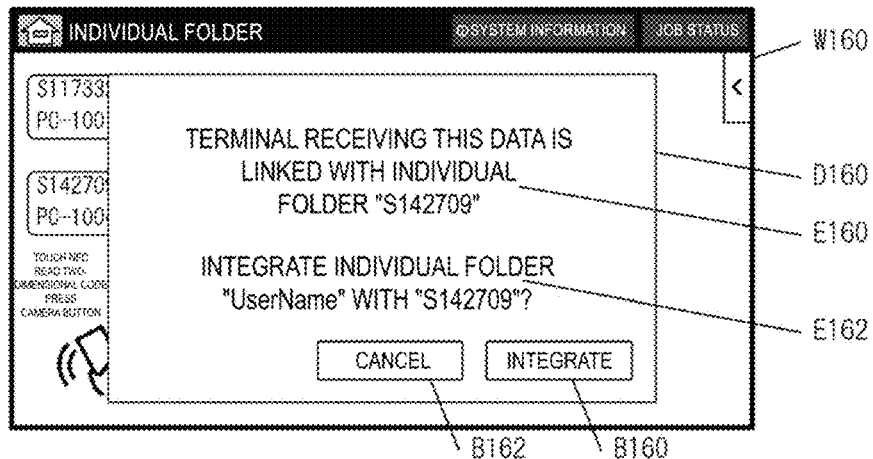
FIGS. 17A to 17C are diagrams illustrating an operation example of the first embodiment.
Figure 17B:
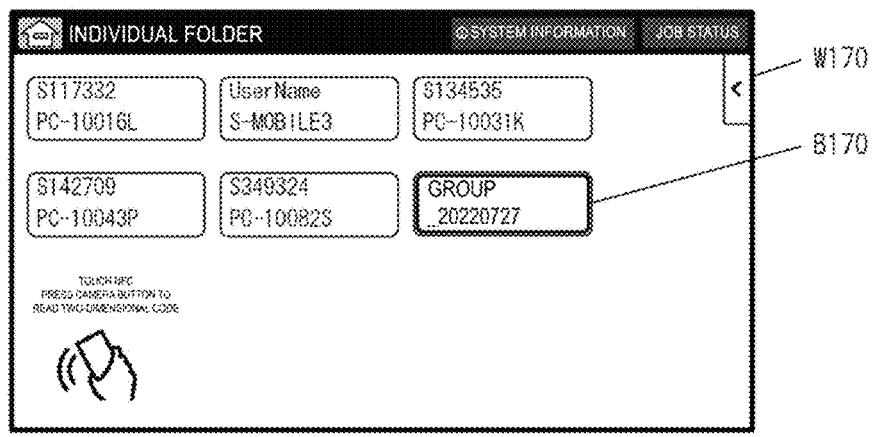
Figure 17C:
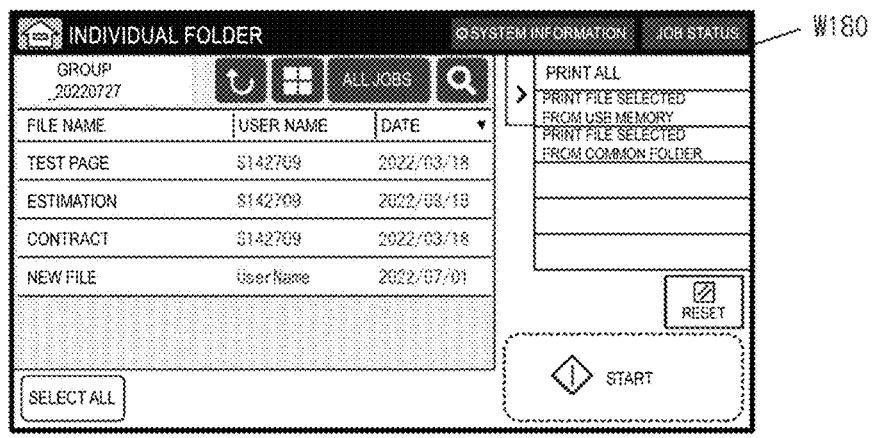

FIGS. 17A to 17C are diagrams illustrating a screen example of a screen displayed on the display 140 of the image forming apparatus 10. FIG. 17A is a screen example of a screen W160 displayed when the image forming apparatus 10 receives data from the terminal apparatus 30 linked to the information processing apparatus 20, and when the individual folder of the terminal apparatus 30 has already been generated. The screen W160 displays a dialog D160 that asks whether the individual folder of the terminal apparatus 30 is to be linked to the individual folder of the information processing apparatus 20. The dialog D160 includes information (for example, a user name of the information processing apparatus 20) E160 of the individual folder of the information processing apparatus 20, and information (for example, the user name of the terminal apparatus 30) E162 of the individual folder of the terminal apparatus 30. The dialog D160 further includes a button B160 that instructs grouping of two individual folders to be performed and a button B162 that instructs the grouping to not be performed.

FIG. 17B is a screen example of a screen W170 displaying a list of individual folders and groups, which is displayed when two individual folders are grouped. A button B170 for selecting a group to which the two individual folders belong is added to the screen W170. FIG. 17C is a screen example of a screen W180 displayed when the button B170 is selected. The screen W180 is a screen for displaying data stored in the individual folder belonging to the group selected by the user. The user can select the data from the screen W180 and execute a job for outputting the data.

When the button B162 is selected on the screen W160 illustrated in FIG. 17A, the individual folders are not grouped. In this case, the button B170 is not added to the screen W170 in FIG. 17B.

Note that a method other than the above-described method may be appropriately changed as long as the terminal apparatus 30 can acquire linkage information, set an individual folder identified on the basis of the linkage information as a data transmission destination, and transmit the data to the individual folder set as the transmission destination. For example, the apparatus information may be one of a user name and a computer name, may be an Internet Protocol (IP) address of the apparatus, or may be a serial number, a model number, or a model name of the apparatus. Thus, the apparatus information may be information unique to the apparatus among the information of the apparatus.

The linkage information need not include the information indicating whether the password is set for the individual folder and the information obtained by encrypting the password. In this case, in step S116 in FIG. 9, the controller 300 transmits the folder identification information included in the linkage information to the image forming apparatus 10. The image forming apparatus 10 transmits, to the terminal apparatus 30, information indicating whether a password is set for the folder identified from the folder identification information received from the terminal apparatus 30. The controller 300 determines whether a password is set on the basis of the information received from the image forming apparatus 10. Similarly, in step S118 in FIG. 9, the controller 300 transmits the folder identification information and the password acquired from the user to the image forming apparatus 10. The image forming apparatus 10 transmits, to the terminal apparatus 30, information indicating whether the password set for the folder identified by the folder identification information received from the terminal apparatus 30 matches the password received from the terminal apparatus 30. The controller 300 determines whether the password is correct on the basis of the information received from the image forming apparatus 10.

In the above description, the system 1 includes one terminal apparatus 30. However, the system 1 may include a plurality of terminal apparatuses 30. In this case, each of the plurality of terminal apparatuses 30 acquires the linkage information from one information processing apparatus 20, so that any of the plurality of terminal apparatuses 30 can transmit data to the individual folder of one information processing apparatus 20.

According to the present embodiment, when a user uses a plurality of apparatuses (multiple devices) including an information processing apparatus such as a PC and a terminal apparatus such as a mobile terminal, the user can link these apparatuses in advance and an individual folder can be commonly used by the two apparatuses. Furthermore, by having a plurality of terminal apparatuses acquire the linkage information displayed on the information processing apparatus, the plurality of terminal apparatuses can use the individual folder of the information processing apparatus. As a result, the user can transmit data to a specific individual folder, and thus can save the trouble of searching for transmitted data. The terminal apparatus can newly add data to the already generated individual folder of the information processing apparatus.

According to the present embodiment, since the linkage information is displayed on the information processing apparatus, the information processing apparatus enables the terminal apparatus to directly acquire the apparatus information of the information processing apparatus. The terminal apparatus can transmit data to the individual folder of the information processing apparatus by transmitting the apparatus information of the information processing apparatus to the image forming apparatus.

2. Second Embodiment

A second embodiment is an embodiment in which the terminal apparatus 30 of the first embodiment acquires the linkage information from the image forming apparatus 10.

In the present embodiment, the controller 100 of the image forming apparatus 10 displays the linkage information together with the folder name of the individual folder in step S170 in FIG. 13 in the first embodiment. For example, the controller 100 displays the linkage information including the individual folder ID as the folder identification information. The linkage information may include information such as whether a folder name or a password is set. The folder identification information may include apparatus information of an apparatus corresponding to the individual folder.

Similarly, the controller 100 of the image forming apparatus 10 displays the linkage information together with the folder name of the user folder in step S190 in FIG. 14 in the first embodiment. For example, the controller 100 displays the linkage information including the user folder ID as the folder identification information. The linkage information may include information such as a folder name.

The controller 300 of the terminal apparatus 30 executes the processing illustrated in FIG. 9 in the first embodiment. Here, the controller 300 reads the linkage information displayed on the display 140 of the image forming apparatus 10 in step S112 in FIG. 9. When the password is set, the controller 100 causes the user to input the password at the timing when the linkage information is recognized. The controller 300 stores the folder ID included in the linkage information as the folder identification information in step S116 in FIG. 9, and transmits the folder ID as the folder identification information in step S124 in FIG. 10. Thus, when the linkage information is acquired from the image forming apparatus 10, the controller 300 can transmit the data to the folder identified on the basis of the folder identification information included in the acquired linkage information.

Further, the controller 100 of the image forming apparatus 10 identifies the individual folder or the user folder identified by the folder ID received as the folder identification information in step S152 in FIG. 12 in the first embodiment as the data-storing folder. In step S154, the controller 100 stores the received data in the folder identified in step S152.

The controller 100 of the image forming apparatus 10 may display an identification code for the group in step S170 in FIG. 13 of the first embodiment. When the terminal apparatus 30 recognizes the identification code for the group, the terminal apparatus 30 may display information of the individual folder belonging to the group or data stored in the individual folder belonging to the group.

Figure 18:
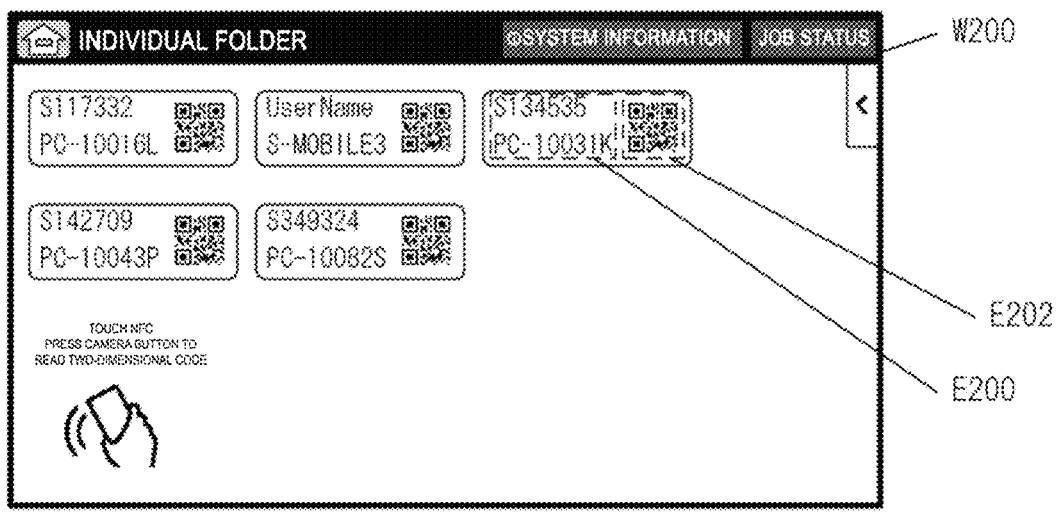
FIG. 18 is a diagram illustrating an operation example of a second embodiment.

FIG. 18 is a diagram illustrating a screen example of a screen W200 displaying a list of individual folders displayed on the display 140 of the image forming apparatus 10. As illustrated in FIG. 18, on the screen W200, the folder name of the individual folder (for example, an area E200 in FIG. 18) and the linkage information corresponding to the individual folder (for example, an area E202 in FIG. 18) are displayed.

FIGS. 19A to 19D are diagrams illustrating a screen example of a screen displayed on the display 340 of the terminal apparatus 30. FIG. 19A is a diagram illustrating a screen example of a data transmission screen W220. The data transmission screen W220 includes a button B220 for acquiring linkage information. FIG. 19B is a screen example of a screen W230 displayed when the button B220 is selected. The image acquired by the imager 320 is displayed on the screen W230, and the linkage information included in the image is recognized. When the linkage information is recognized, as illustrated in FIG. 19C, a message M240 inquiring whether the linking is to be performed may be displayed. In addition, when the linking is performed and a password is set for an individual folder identified on the basis of the linkage information, the user may be requested to input the password. FIG. 19D is a diagram illustrating a screen example of a screen W250 displayed after the linking has been performed. In an area E250 of the screen W250, information (for example, a folder name) of the linked folder is displayed.

According to the present embodiment as described above, the terminal apparatus can directly acquire the linkage information displayed on the image forming apparatus and transmit data to the folder generated in the image forming apparatus.

3. Third Embodiment

A third embodiment is an embodiment in which, in addition to the processing of acquiring the linkage information using the identification code in the first embodiment, processing of acquiring the linkage information using short range wireless communications is executed. In the present embodiment, FIG. 9 of the first embodiment is replaced with FIG. 20, and FIG. 13 of the first embodiment is replaced

3.1 Processing Flow

3.1.1 Processing of Terminal Apparatus

Figure 20:
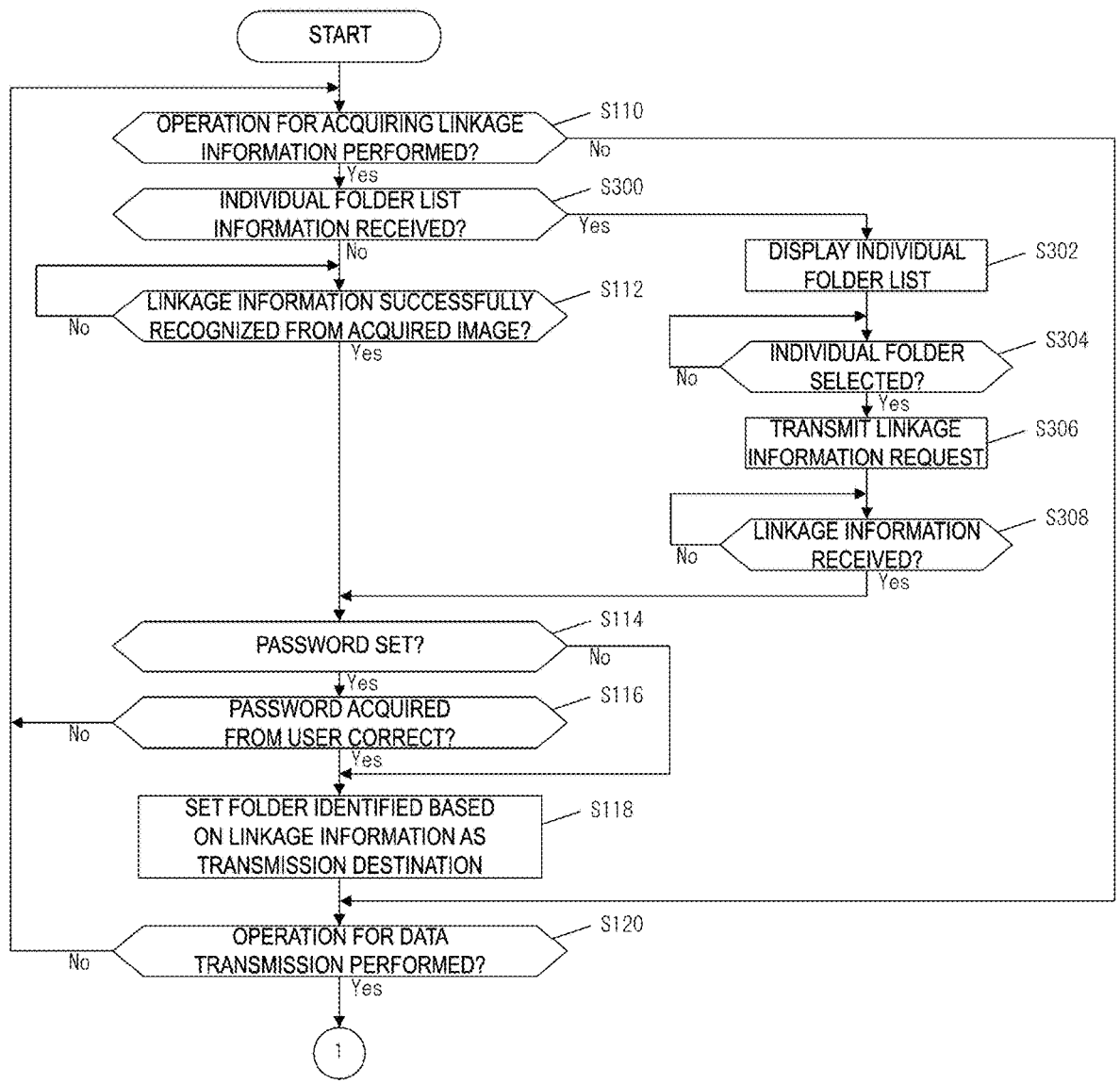
FIG. 20 is a diagram illustrating processing executed by a terminal apparatus of a third embodiment.

FIG. 20 is a diagram illustrating processing executed by the terminal apparatus 30. In the present embodiment, when the operation for acquiring the linkage information is performed, the controller 300 determines whether the individual folder list information is received from the image forming apparatus 10 via the short range wireless communicator 380 (step S300). The individual folder list information is information of a list including, for each individual folder, a folder name of the individual folder and apparatus information (a user name and a computer name) of an apparatus corresponding to the individual folder as items. When the individual folder list information is received, the controller 300 displays the individual folder list on the display 340 in a selectable manner (Yes in step S300, the processing proceeds to step S302).

When one individual folder is selected by the user from the individual folder list displayed in step S302, the controller 300 transmits a request for linkage information corresponding to the selected individual folder to the image forming apparatus 10 via the short range wireless communicator 380 (Yes in step S304, the processing proceeds to step S306). When the individual folder is not selected, the controller 300 repeats the processing of step S304 (No in step S304).

The controller 300 determines whether the linkage information is received from the image forming apparatus 10 via the short range wireless communicator 380 (step S308). The controller 300 executes the processing of step S308 until the linkage information is received (No in step S308). On the other hand, when the linkage information is received (Yes in step S308), the controller 300 executes the processing of step S114 and the subsequent steps on the basis of the received linkage information.

3.1.2 Processing by Image Forming Apparatus

Figure 21:
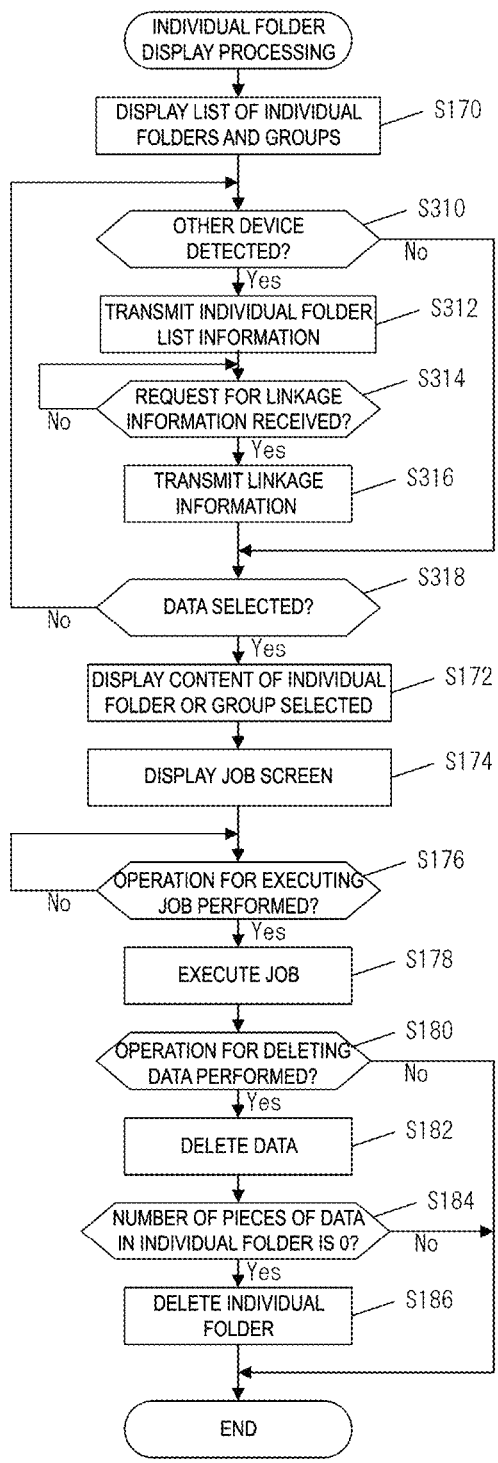
FIG. 21 is a diagram illustrating processing executed by an image forming apparatus of the third embodiment.

FIG. 21 is a diagram illustrating processing executed by the image forming apparatus 10. In the present embodiment, when another apparatus is detected via the short range wireless communicator 180 after a list of individual folders and groups has been displayed, the controller 100 transmits list information of individual folders to the other apparatus via the short range wireless communicator 180 (Yes in step S310, the processing proceeds to step S312). For example, the controller 100 generates, for each individual folder information stored in the individual folder information storage area 168, a list including, as items, a folder name and apparatus information included in the individual folder information, and transmits the list to the detected other apparatus via the short range wireless communicator 180.

Upon receiving a request for linkage information corresponding to an individual folder from another apparatus via the short range wireless communicator 180, the controller 100 transmits the linkage information corresponding to the individual folder to the other apparatus via the short range wireless communicator 180 (Yes in step S314, the processing proceeds to step S316). When the request for the linkage information is not received, the controller 100 repeats the processing of step S314 (No in step S314). When another apparatus is not detected in step S310, the controller 100 omits the processing from step S312 to step S316 (No in step S310).

When the data is selected, the controller 100 executes the processing from step S172 to step S186 (Yes in step S318). On the other hand, when the data is not selected, the controller 100 returns to step S310 (No in step S318, the processing proceeds to step S310).

3.2 Operation Example

Figure 22A:
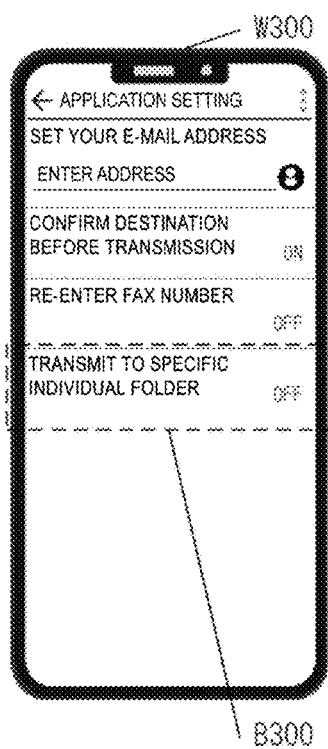
FIGS. 22A to 22E are diagrams illustrating an operation example of the third embodiment.
Figure 22B:
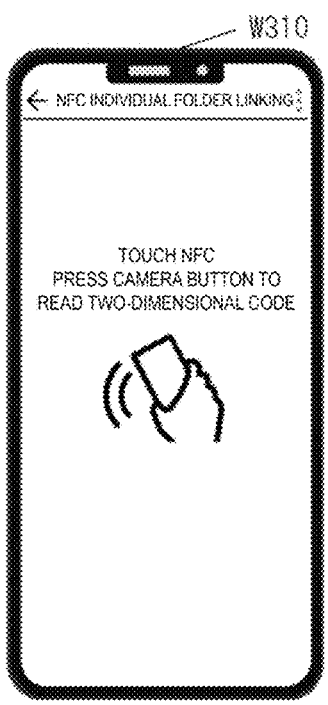
Figure 22C:
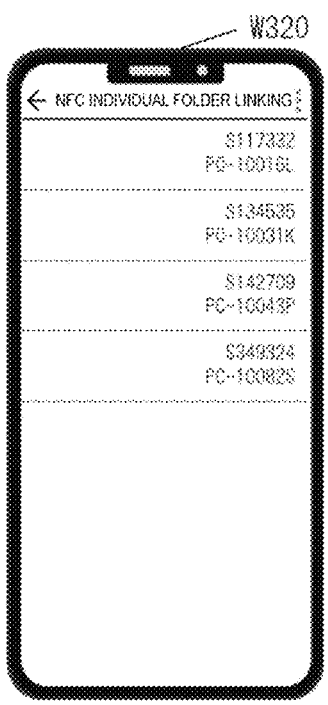

FIGS. 22A to 22E are diagrams illustrating a screen example of a screen displayed on the display 340 of the terminal apparatus 30. FIG. 22A is a diagram illustrating a screen example of a data transmission screen W300. The data transmission screen W300 includes a button B300 for acquiring linkage information. FIG. 22B is a screen example of a screen W310 displayed when the button B300 is selected. On the screen W310, a message prompting the user to bring the terminal apparatus 30 close to the short range wireless communicator 180 of the image forming apparatus 10 is displayed. FIG. 22C is a diagram illustrating a screen example of a screen W320 displayed when the individual folder list information is received from the image forming apparatus 10. On the screen W320, a folder name and apparatus information of a corresponding apparatus are selectably displayed for each individual folder.

Figure 22D:
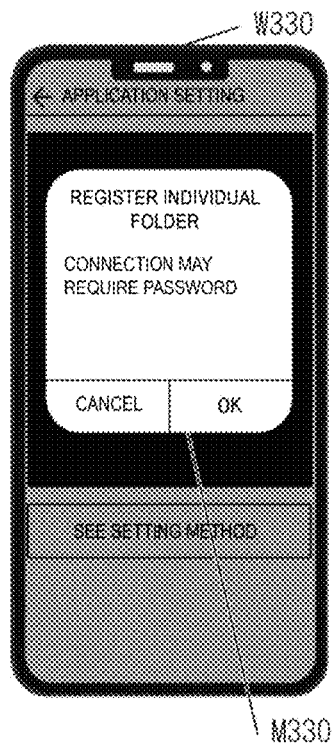
Figure 22E:
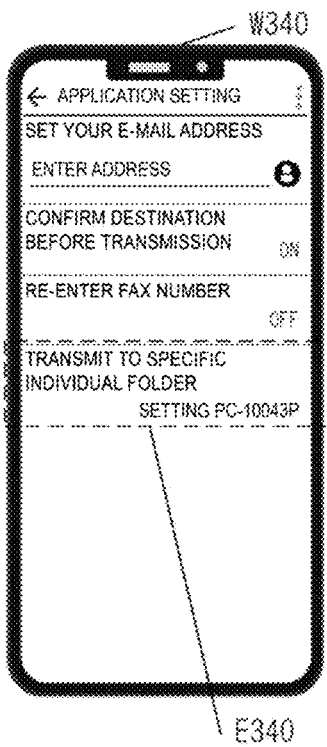

FIG. 22D is a diagram illustrating a screen example of a screen W330 displayed when one individual folder is selected on the screen W320. On the screen W330, a message M330 asking the user whether linking is to be performed may be displayed. In addition, when a password is set for an individual folder identified on the basis of the linkage information, the user may be requested to input the password. FIG. 22E is a diagram illustrating a screen example of a screen W340 displayed after the linking is performed. The screen W340 displays information of the individual folder set as the data transmission destination (for example, the folder name of the individual folder).

According to the present embodiment, the user can acquire the linkage information and set the data transmission destination by performing the operation of bringing the terminal apparatus close to the image forming apparatus without performing the operation of recognizing the identification code.

4. Fourth Embodiment

A fourth embodiment is an embodiment in which, in addition to the processing described in the first embodiment, group individual folders can be grouped, individual folder names or group names can be changed, or detailed information of individual folders or groups can be displayed for the user. In the present embodiment, FIG. 13 of the first embodiment is replaced with FIG. 23. Note that the same processing is denoted by the same reference numeral, and description thereof is omitted.

4.1 Processing Flow

Figure 23:
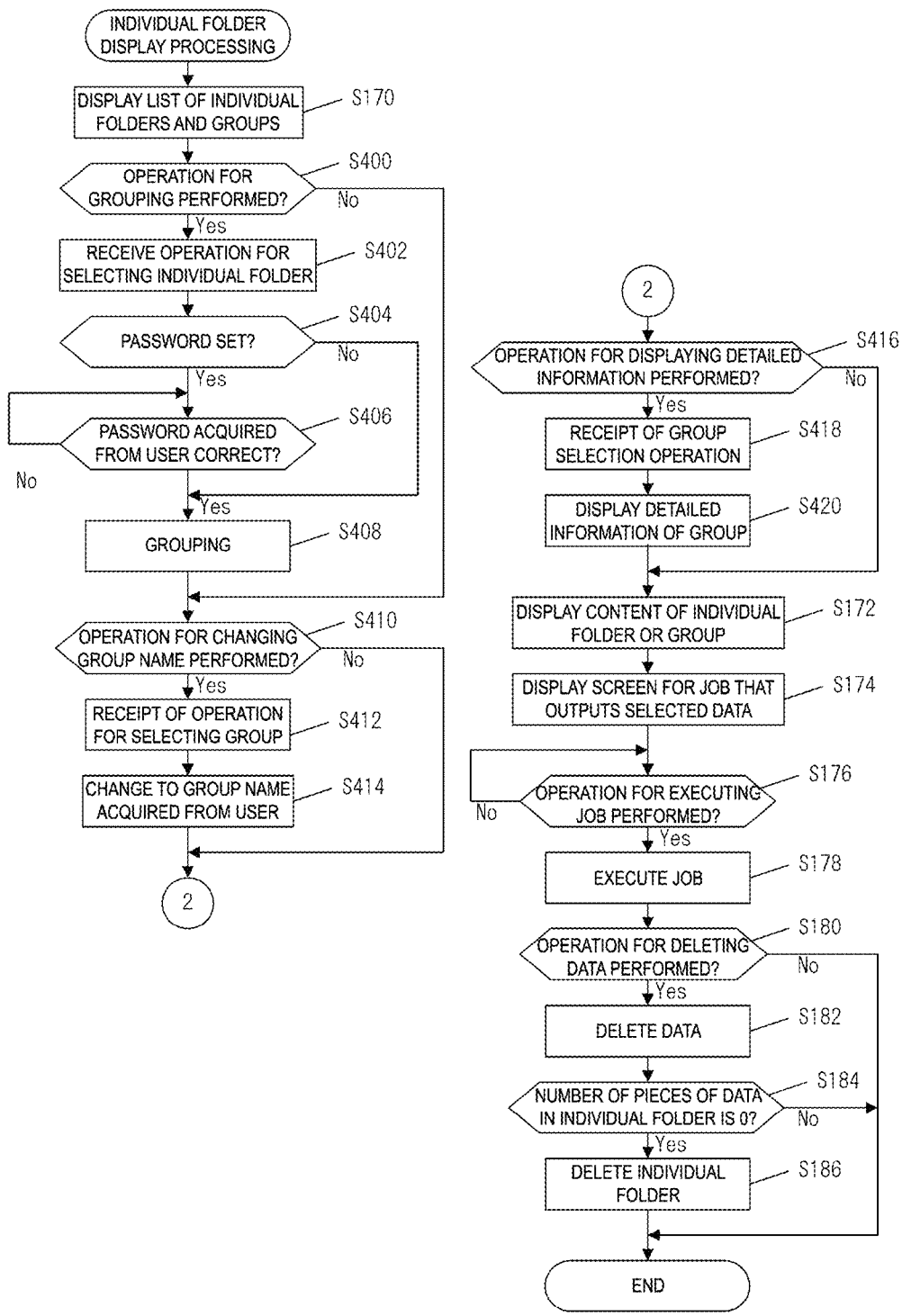
FIG. 23 is a diagram illustrating a flow of individual folder display processing of a fourth embodiment.

FIG. 23 is a flowchart illustrating a flow of individual folder display processing of the present embodiment. In the present embodiment, after a list of individual folders and groups has been displayed, when an operation of grouping individual folders is performed by the user, the controller 100 receives an operation of selecting individual folders to be grouped (Yes in step S400, the processing proceeds to step S402). When the password is set for the selected individual folder, the controller 100 acquires the password from the user and determines whether the acquired password is correct (Yes in step S404, the processing proceeds to step S406). When passwords have respectively been set for a plurality of individual folders among the individual folders selected by the user, the controller 100 acquires a password for each of the plurality of individual folders.

When the acquired password is correct, that is, when the acquired password matches the password set for the individual folder, the controller 100 groups the individual folders selected in step S402 (Yes in step S406, the processing proceeds to step S408). The processing of step S408 is the same as the processing of step S162 in FIG. 12. When the password is incorrect, the controller 100 repeats the processing of step S406 (No in step S406).

Upon determining in step S404 that a password has not been set, the controller 100 omits the processing in step S406 (No in step S404). Upon determining in step S400 that the operation of grouping the individual folders is not performed, the controller 100 omits the processing from step S402 to step S408 (No in step S400).

Subsequently, when an operation of changing the group name is performed, the controller 100 receives an operation of selecting a group from the user (Yes in step S410, the processing proceeds to step S412). Further, the controller 100 acquires a group name from the user and changes the group name of the group selected in step S412 to the group name acquired from the user (step S414). For example, the controller 100 stores the group name acquired from the user in the group information of the group selected in step S412. Upon determining in step S410 that the operation of changing the group name is not performed, the controller 100 omits the processing of step S412 and step S414 (No in step S410).

Subsequently, when the user performs an operation of displaying the detailed information of the group, the controller 100 receives an operation of selecting the group (Yes in step S416, the processing proceeds to step S418). Subsequently, the controller 100 displays the detailed information of the group selected in step S418 (step S420). For example, the controller 100 displays the group name, the folder names of the grouped individual folders, the total number of pieces of data in the individual folders belonging to the group, the last update date of the data, whether a password has been set, the identification code, and the like. Upon determining in step S416 that the operation of displaying the detailed information of the group is not performed, the controller 100 omits the processing of step S418 and step S420 (No in step S416).

4.2 Operation Example

Figure 24A:
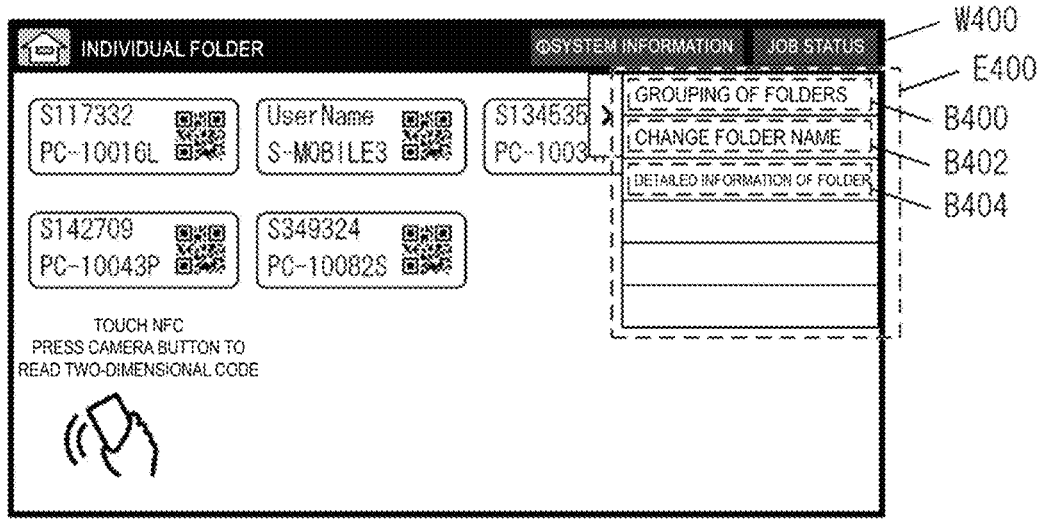
FIGS. 24A and 24B are diagrams illustrating an operation example of the fourth embodiment.

FIGS. 24A to 27 are diagrams illustrating a screen example of a screen displayed on the display 140 of the image forming apparatus 10. FIG. 24A is a diagram illustrating a screen example of a screen W400 displaying a list of individual folders. On the screen W400, a side menu E400 can be displayed. The side menu E400 includes a button B400 for grouping individual folders, a button B402 for changing an individual folder name or a group name, and a button B404 for displaying detailed information of an individual folder or a group.

Figure 24B:
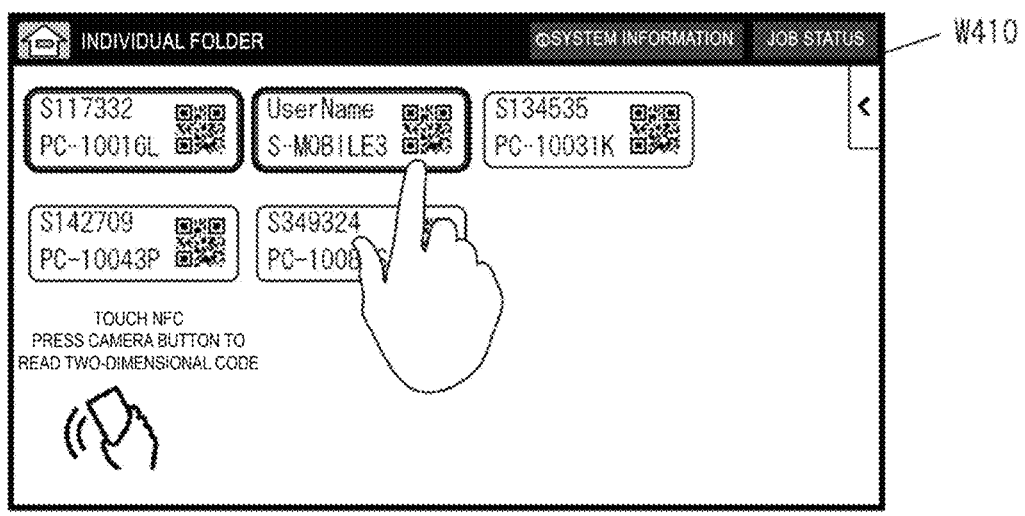

FIG. 24B is a diagram illustrating a screen example of a screen W410 displayed when the button B400 is selected on the screen W400. On the screen W410, an operation of selecting an individual folder by the user is received. Note that the selected individual folder may be distinguishably displayed by being displayed differently from the unselected individual folder.

Figure 25A:
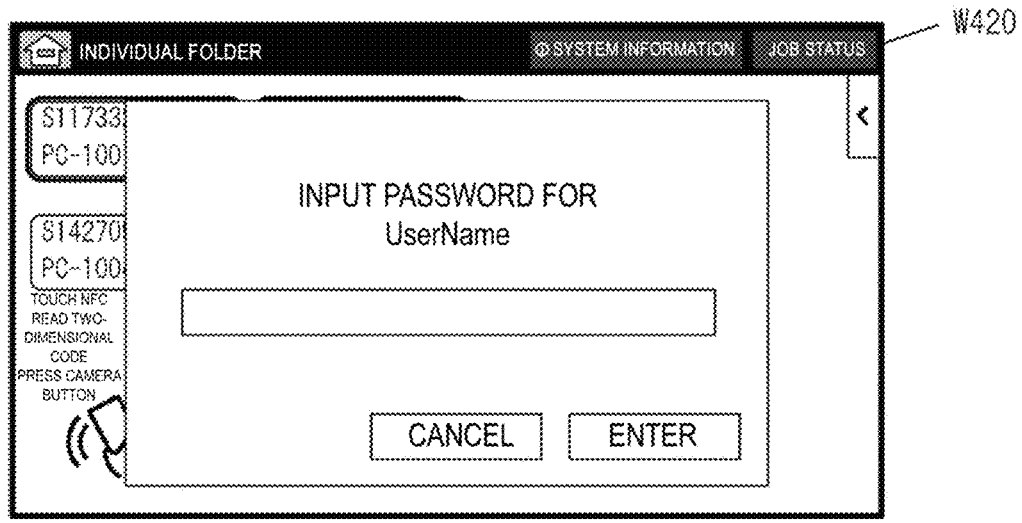
FIGS. 25A and 25B are diagrams illustrating an operation example of the fourth embodiment.
Figure 25B:
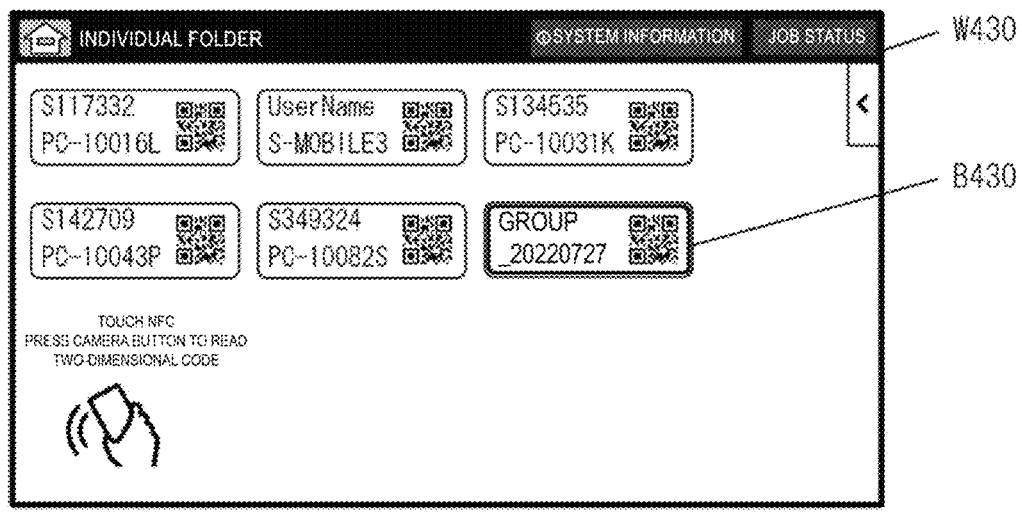

FIG. 25A is a diagram illustrating a screen example of a screen W420 displayed when a password is set for the individual folder selected on the screen W410. The user inputs the password set for the individual folder. FIG. 25B is a diagram illustrating a display example of a screen W430 displayed when the password input in the screen W420 is correct. As illustrated in the screen W430, a group is generated (button B430 in FIG. 25B. The group name is automatically assigned on the basis of the date or the like. When no password is set for the individual folder selected on the screen W410, the screen W420 is not displayed.

Figure 26A:
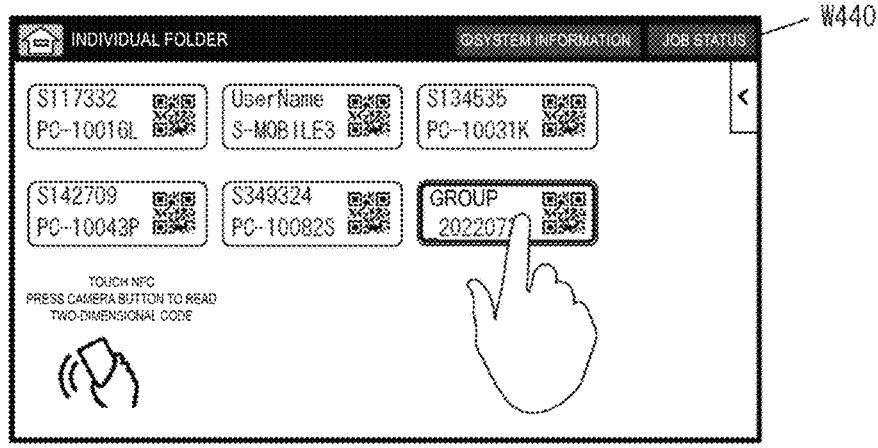
FIGS. 26A to 26C are diagrams illustrating an operation example of the fourth embodiment.
Figure 26B:
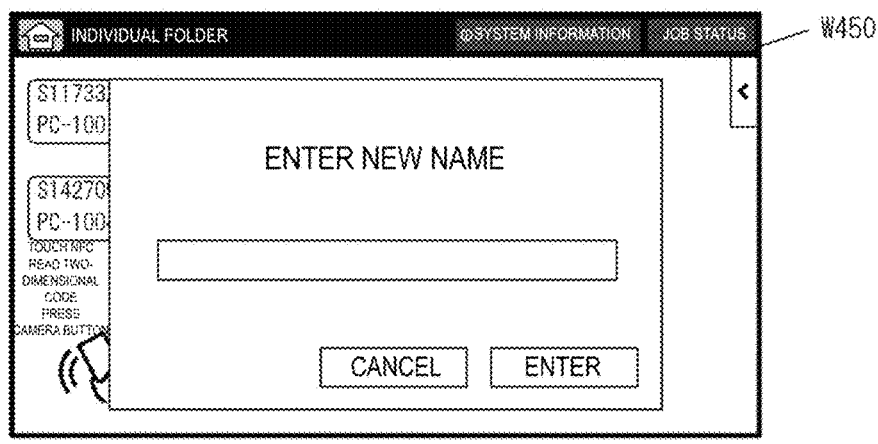
Figure 26C:
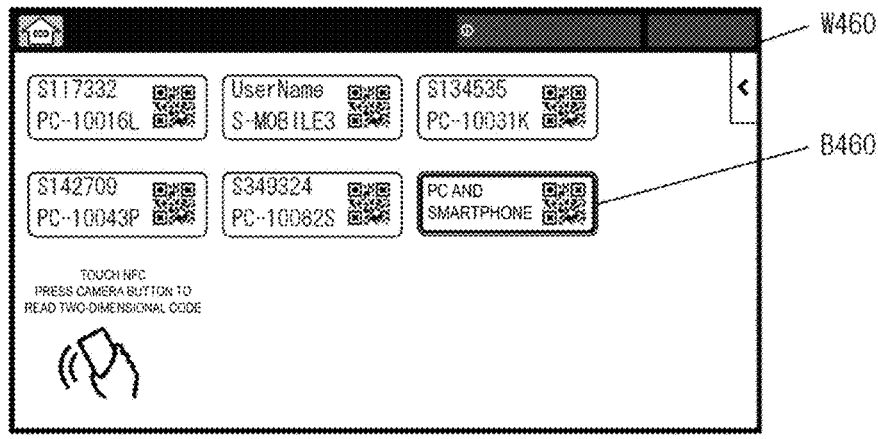

FIG. 26A is a diagram illustrating a screen example of a screen W440 displayed when the button B402 is selected on the screen W400 illustrated in FIG. 24A. On the screen W440, a group selection operation is received. FIG. 26B is a diagram illustrating a screen example of a screen W450 displayed when a group is selected on the screen W440. On the screen W450, input of a group name is accepted. FIG. 26C is a diagram illustrating a screen example of a screen W460 displayed when a group name is input on the screen W450. As indicated by a button B460 in FIG. 26C, the group name of the group selected by the user is changed to a new group name.

Figure 27:
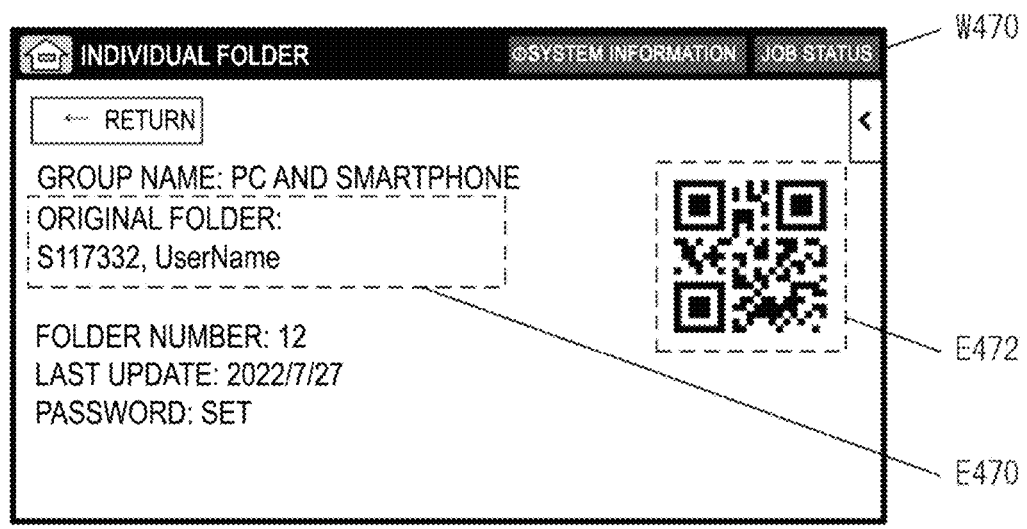
FIG. 27 is a diagram illustrating an operation example of the fourth embodiment.

When the button B404 is selected on the screen W400 in FIG. 24A, the screen that receives the group selection operation is displayed as represented by the screen W440 in FIG. 26A. When the group is selected, a screen W470 as illustrated in FIG. 27 is displayed. The screen W470 is a screen displaying detailed information of the group. The screen W470 includes an area E470 for displaying individual folder names of individual folders belonging to the group and an area E472 for displaying an identification code corresponding to the group. When the detailed information of the individual group is displayed, the area E470 is not displayed.

According to the present embodiment, even when a plurality of individual folders are generated by transmitting data to the image forming apparatus using different apparatuses, the user can freely group a plurality of individual folders or change a group name. For example, immediately after a group is generated, since the group name is an automatically generated name, it is difficult for the user to identify the group. According to the present embodiment, the user can change the group name to a group name easily identifiable. Further, the user can check the information of the individual folders belonging to the group.

5. Fifth Embodiment

A fifth embodiment is an embodiment in which information of individual folders is managed by a server apparatus. Specifically, the server apparatus has a database that stores information of the individual folder. The fifth embodiment is an embodiment in which FIG. 1 of the first embodiment is replaced with FIG. 28, FIG. 8 of the first embodiment is replaced with FIG. 31, FIG. 9 of the first embodiment is replaced with FIG. 32, and FIG. 11 of the first embodiment is replaced with FIG. 34. Note that the same apparatus, functional unit, and processing are denoted by the same reference numerals, and description thereof is omitted.

5.1 Overall Configuration and Functional Configuration

Figure 28:
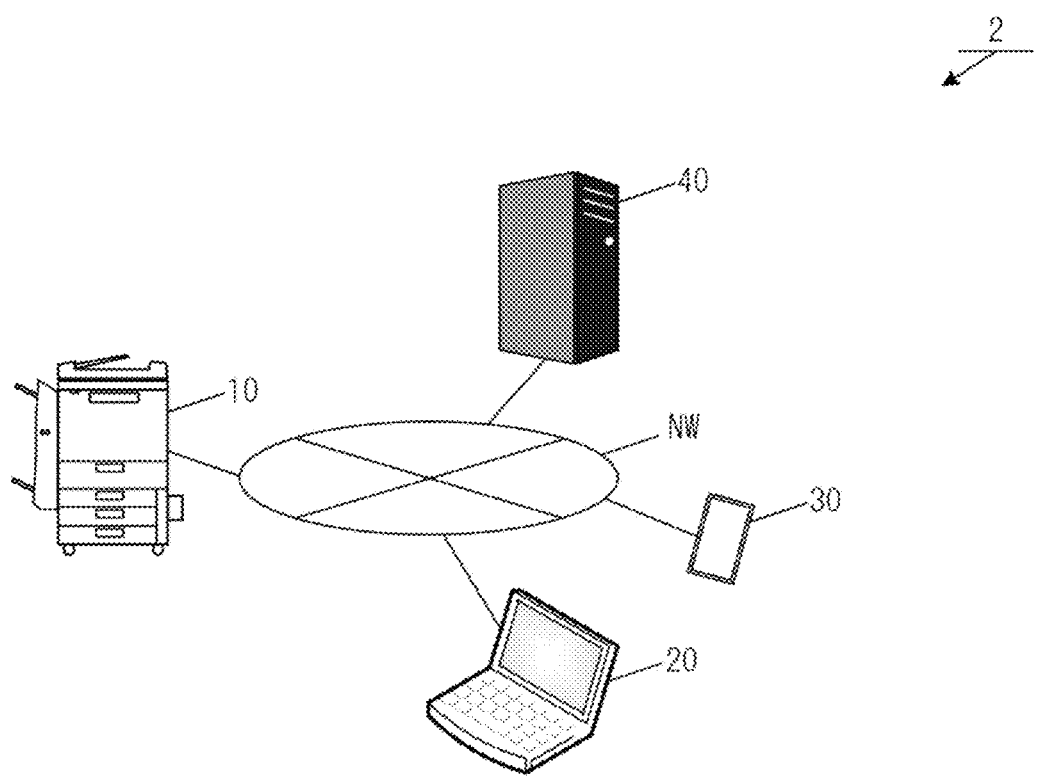
FIG. 28 is a diagram illustrating an overall configuration of a system of a fifth embodiment.
Figure 29:
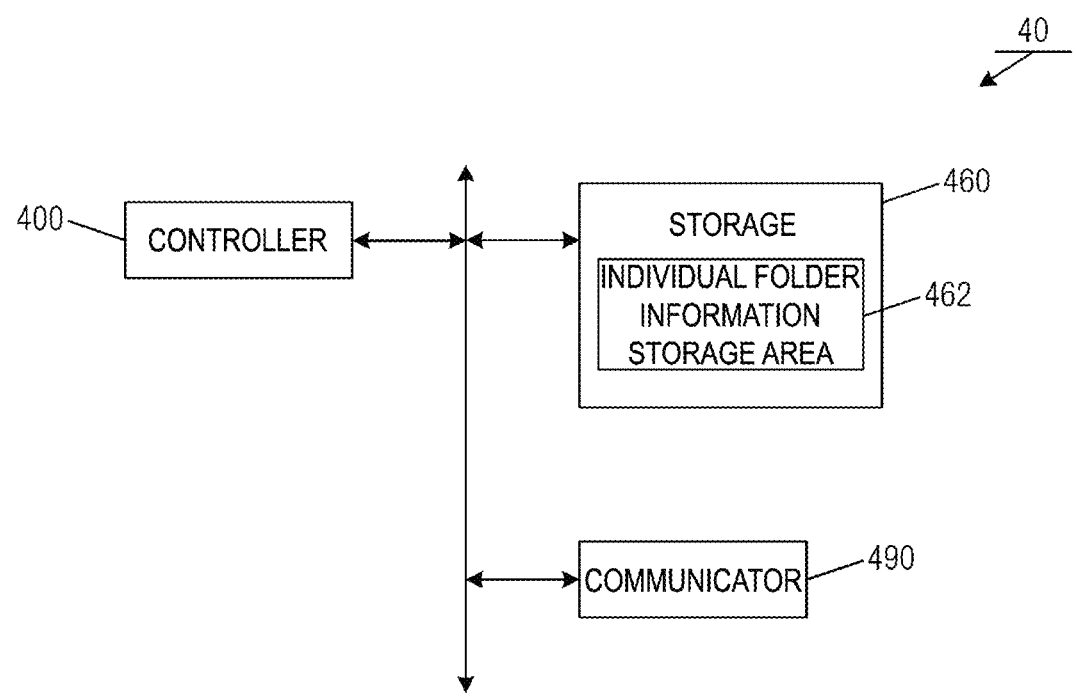
FIG. 29 is a diagram illustrating a functional configuration of a server apparatus of the fifth embodiment.

FIG. 28 is a diagram illustrating an overall configuration of a system 2 of the present embodiment. In the system 2, a server apparatus 40 is further connected to the network NW of the system 1. As illustrated in FIG. 29, the server apparatus 40 includes, for example, a controller 400, a storage 460, and a communicator 490.

The controller 400 is a functional unit for controlling the entirety of the server apparatus 40. The controller 400 realizes various functions by reading and executing various programs stored in the storage 460. The controller 400 is constituted by the same arithmetic device as the controller 100.

The storage 460 stores various programs and various types of data necessary for the operation of the server apparatus 40. The storage 460 is constituted by the same storage device as the storage 160. Further, the storage 460 secures an individual folder information storage area 462 for storing individual folder information. The data configuration of the individual folder information is the same as that of the individual folder information illustrated in FIG. 3A. Thus, the individual folder information storage area 462 is a database that stores information of individual folders.

The communicator 490 communicates with another apparatus such as a device via a network such as a LAN or a WAN. The communicator 490 is constituted by the same communication device or communication module as the communicator 190.

5.2 Processing Flow 5.2.1 Overview of Processing Flow

Figure 30:
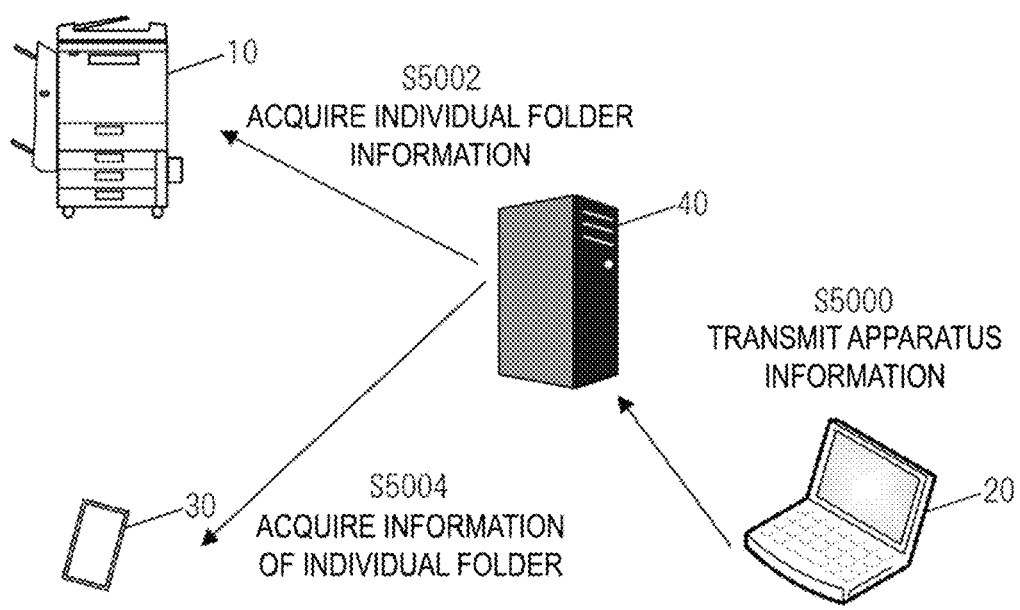
FIG. 30 is a diagram illustrating an overview of processing of the fifth embodiment.

FIG. 30 is a diagram illustrating an overview of processing of the present embodiment. The information processing apparatus 20 transmits apparatus information to the server apparatus 40 (S5000). The server apparatus 40 generates and stores the individual folder information using the apparatus information.

On the other hand, the image forming apparatus 10 acquires the individual folder information stored in the server apparatus 40 (S5002). Thus, when the system 2 includes a plurality of the image forming apparatuses 10, the same individual folder information can be used among the plurality of image forming apparatuses 10. The terminal apparatus 30 acquires information of the individual folder from the server apparatus 40 (S5004). As a result, the terminal apparatus 30 can select an individual folder as the data transmission destination.

5.2.2 Processing by Information Processing Apparatus

Figure 31:
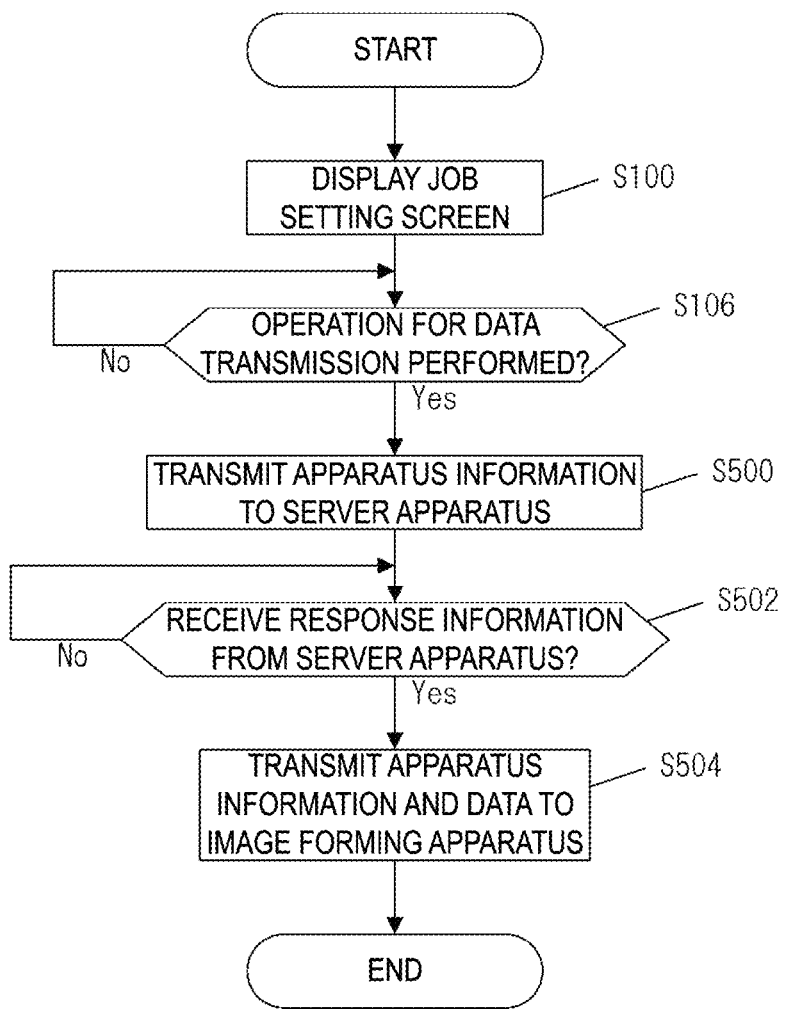
FIG. 31 is a diagram illustrating processing executed by an information processing apparatus of the fifth embodiment.

FIG. 31 is a diagram illustrating processing executed by the information processing apparatus 20. When the operation for data transmission is performed, the controller 200 transmits the apparatus information of the information processing apparatus 20 to the server apparatus 40 (step S500). Upon receiving response information from the server apparatus 40, the controller 200 transmits the apparatus information and the data to the image forming apparatus 10 (Yes in step S502 the processing proceeds to step S504). The response information is information indicating that the apparatus information transmitted by the information processing apparatus 20 has been received and processing according to the apparatus information has been executed. When the response information is not received from the server apparatus, the controller 200 repeats the processing of step S502 until the response information is received (No in step S502).

5.2.3 Processing by Terminal Apparatus

Figure 32:
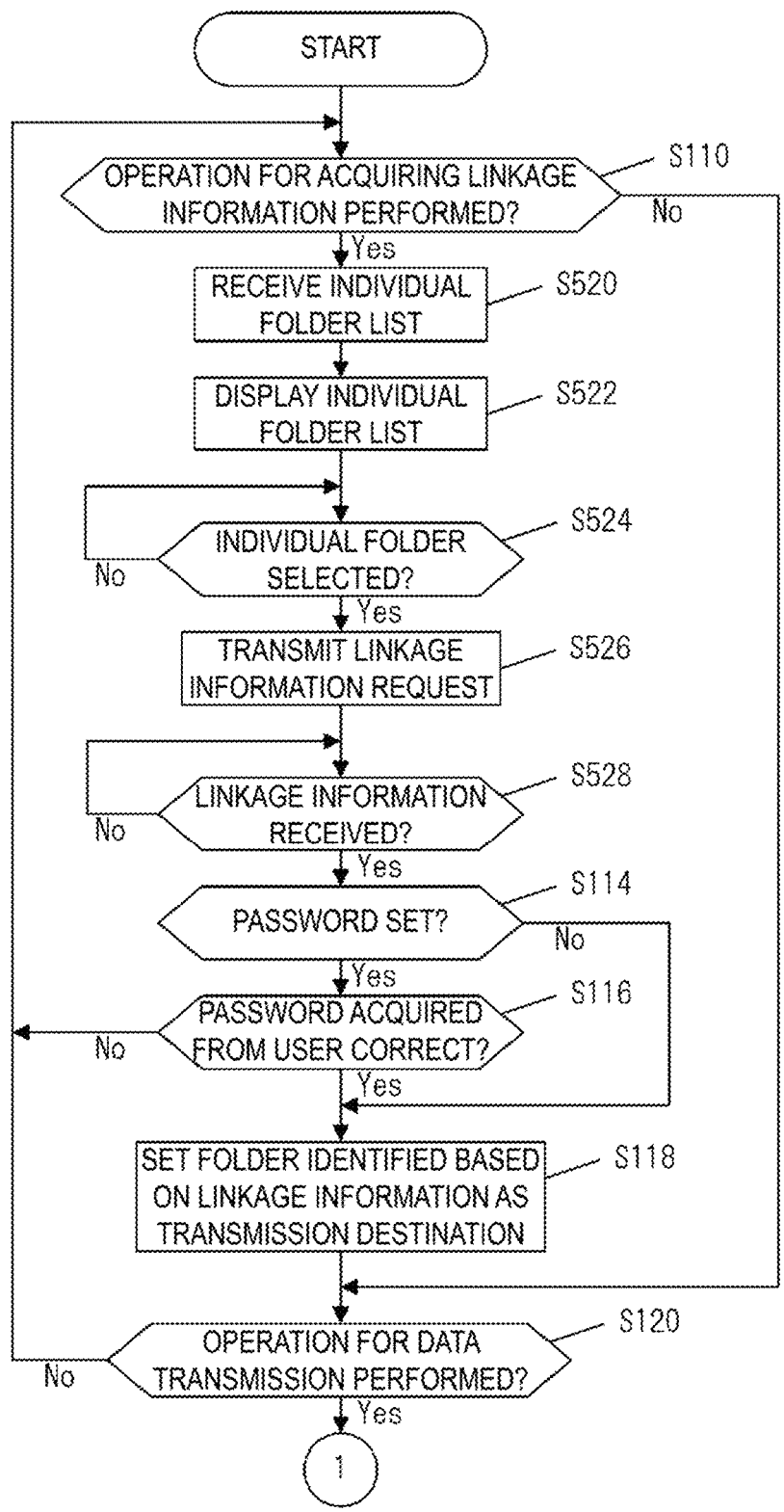
FIG. 32 is a diagram illustrating processing executed by a terminal apparatus of the fifth embodiment.

FIG. 32 is a flowchart illustrating a flow of processing executed by the terminal apparatus 30. In the present embodiment, when the operation for acquiring the linkage information is performed, the controller 300 requests the server apparatus 40 for the list information of the individual folder and receives the list information of the individual folder from the server apparatus 40 (step S520). As described in the third embodiment, the individual folder list information is a list in which the individual folder name and the apparatus information are set as items for each individual folder. The controller 300 displays a list of individual folders (step S522). When one individual folder is selected from the list of individual folders, the controller 300 transmits a request for linkage information of the selected individual folder to the server apparatus 40 (Yes step S524, the processing proceeds to step S526). When the individual folder is not selected, the controller 300 repeats the processing of step S524 (No in step S524).

The controller 300 executes the processing of step S528 until the linkage information is received from the server apparatus 40 (No in step S528). On the other hand, when the linkage information is received, the controller 300 executes the processing of step S116 and the subsequent steps on the basis of the received linkage information (Yes in step S528). Regarding the processing in step S116 and step S118, if it is not possible to determine from the linkage information whether a password has been set or whether the password acquired from the user is correct, the controller 300 issues an inquiry to the server apparatus 40.

5.2.4 Processing by Server Apparatus

Figure 33:
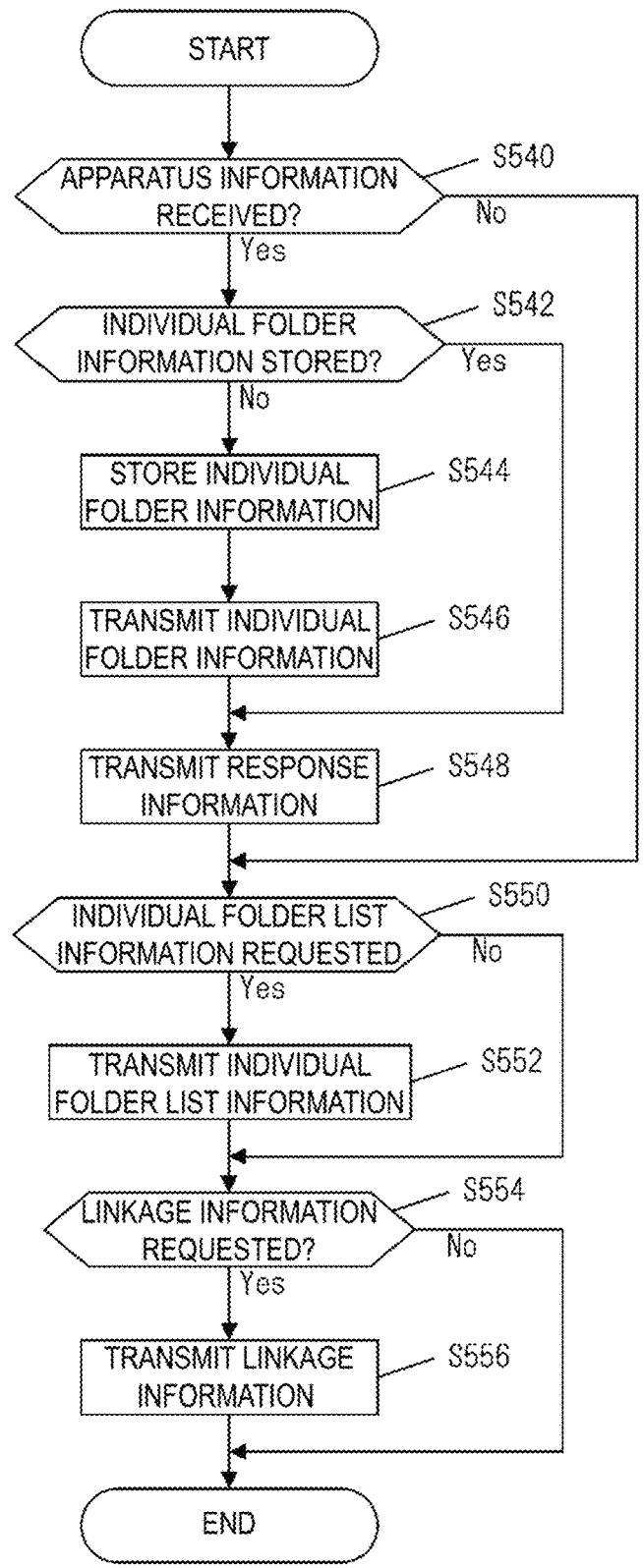
FIG. 33 is a diagram illustrating processing executed by a server apparatus of the fifth embodiment.

FIG. 33 is a diagram illustrating processing executed by the server apparatus 40. When apparatus information is received from another apparatus (Yes in step S540), the controller 400 determines whether individual folder information including the apparatus information is stored (step S542).

When the individual folder information including the apparatus information received in step S540 is not stored, the controller 400 stores the individual folder information on the basis of the apparatus information (No in step S542, the processing proceeds to step S544). For example, the controller 400 determines an individual folder ID and a folder name, and stores individual folder information including the individual folder ID, the folder name, and the apparatus information in the individual folder information storage area 462. The controller 400 transmits the individual folder information stored in step S544 to the image forming apparatus 10 (step S546). Upon determining that the individual folder information including the apparatus information is stored in step S542, the controller 400 omits the processing of step S544 and Step S546 (Yes in step S542).

Subsequently, the controller 400 transmits the response information to the device that has transmitted the apparatus information (step S548). Upon determining in step S540 that the apparatus information is not received, the controller 400 omits the processing from step S542 to step S548 (No in step S540).

Subsequently, when the list information of the individual folder is requested from another apparatus, the controller 400 transmits the list information of the individual folder to the other apparatus (Yes in step S550, the processing proceeds to step S552). When the list information of the individual folder is not requested from the other apparatus, the controller 400 omits the processing of step S552 (No in step S550).

When the linkage information of the individual folder is requested from another apparatus, the controller 400 transmits the requested linkage information to the other apparatus (Yes in step S554, the processing proceeds to step S556). When the linkage information is not requested from the other apparatus, the controller 400 omits the processing of step S556 (No in step S554).

In addition to the above-described processing, when an inquiry about whether the password of the individual folder is set or whether the password is correct is received from another apparatus, the controller 400 transmits information indicating whether the password is set or information indicating whether the password is correct to the other apparatus.

5.2.5 Processing by Image Forming Apparatus

Figure 34:
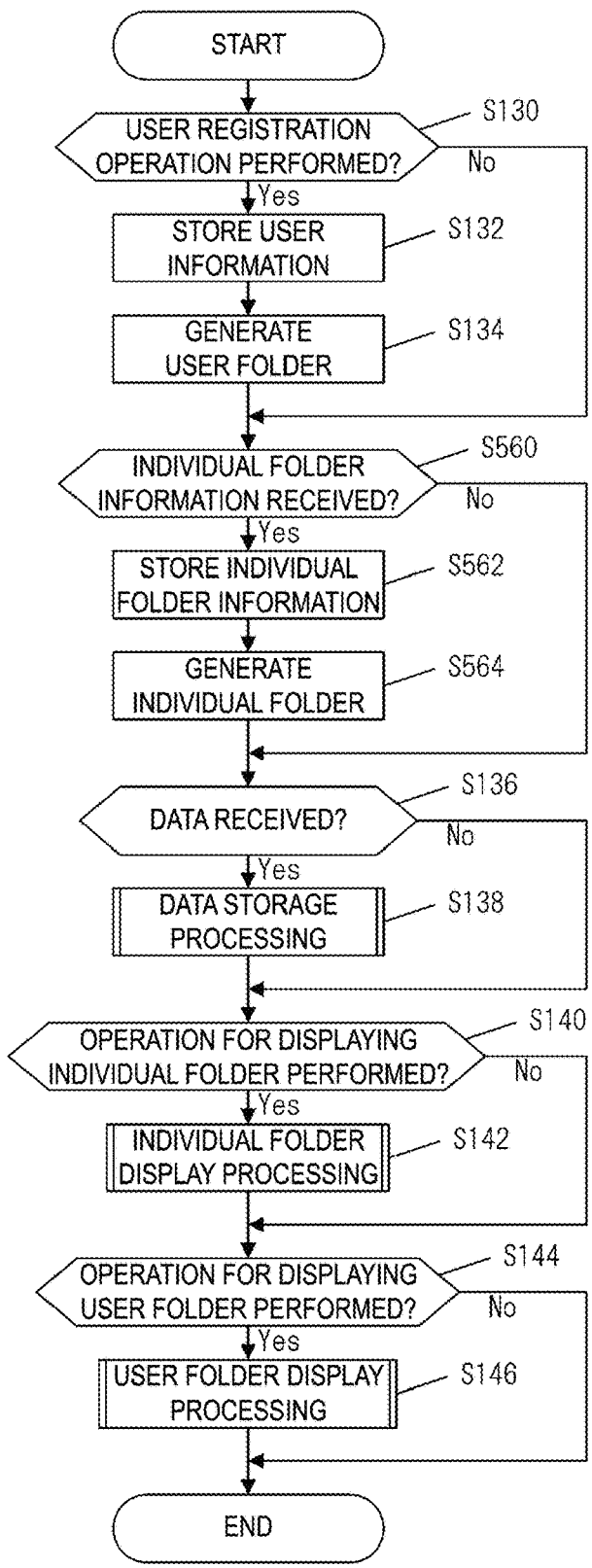
FIG. 34 is a diagram illustrating processing executed by an image forming apparatus of the fifth embodiment.

FIG. 34 is a flowchart illustrating a flow of processing executed by the image forming apparatus 10. In the present embodiment, when individual folder information is received from the server apparatus 40, the controller 100 stores the individual folder information in the individual folder information storage area 168 (Yes in step S560, the processing proceeds to step S562). In addition, the controller 100 generates an individual folder corresponding to the individual folder information received from the server apparatus 40 in the individual folder storage area 1622 (step S564). On the other hand, when the individual folder information is not received, the controller 100 omits the processing of step S562 and step S564 (No in step S560).

With the above-described processing executed as described above, the image forming apparatus 10 can receive the individual folder information and generate the individual folder corresponding to the individual folder information after the individual folder information has been stored by the server apparatus 40. Accordingly, even when the system 2 includes a plurality of the image forming apparatuses 10, the same individual folder information is used by each of the image forming apparatuses 10. Thus, the individual folders generated by the plurality of image forming apparatuses 10 are the same. When there is an individual folder with data not stored in any of the plurality of image forming apparatuses 10 included in the system 2, the server apparatus 40 may execute processing that causes the plurality of image forming apparatuses 10 to delete the individual folder. In addition, the server apparatus 40 may store the group information and transmit the group information to the plurality of image forming apparatuses 10, to make the plurality of image forming apparatuses 10 use the same group information.

5.3 Another Processing Example

As described in the third embodiment, the terminal apparatus 30 may recognize the linkage information displayed on the image forming apparatus 10. In this case, the image forming apparatus 10 may display only minimum information of the folder identification information and whether the password is set, and cause the terminal apparatus 30 to acquire the information of the individual folder from the server apparatus 40.

Figure 35:
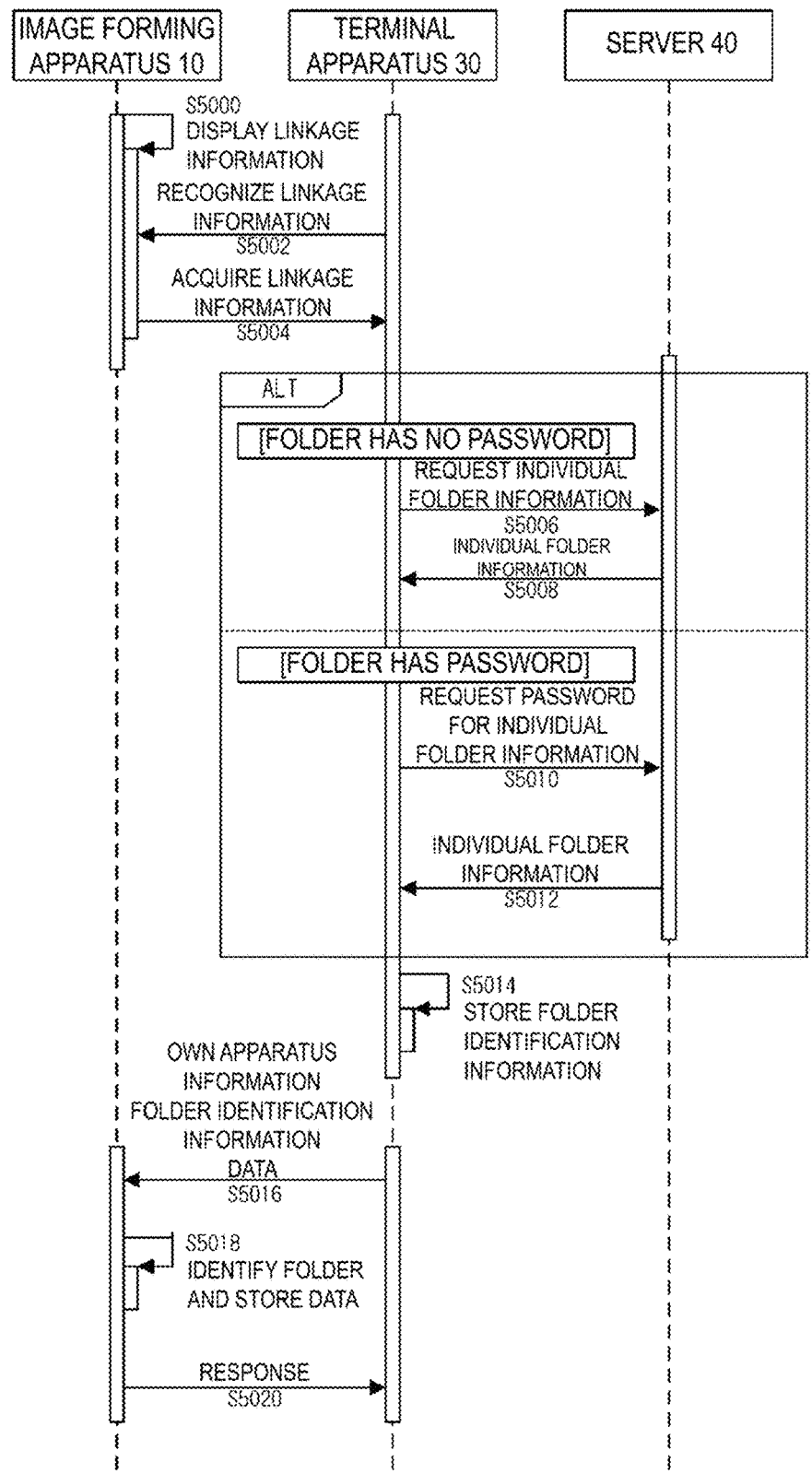
FIG. 35 is a diagram illustrating an overview of another example of the processing of the fifth embodiment.

An overview of the processing in this case will be described with reference to FIG. 35. When displaying a list of individual folders on the display 140, the image forming apparatus 10 displays linkage information corresponding to the individual folder (S5000). The image forming apparatus 10 provides the individual folder ID, which is the folder identification information, and information indicating whether a password is set, in the linkage information.

The terminal apparatus 30 recognizes the image displayed on the display 140 using the imager 320 (S5002), and acquires the linkage information (S5004). When the password is not set, the terminal apparatus 30 transmits a request for individual folder information corresponding to the individual folder ID to the server apparatus 40 (S5006). The server apparatus 40 transmits the individual folder information requested from the terminal apparatus 30 to the terminal apparatus 30 (S5008). Thus, the terminal apparatus 30 can acquire information such as the folder name of the individual folder. On the other hand, when a password is set, the terminal apparatus 30 transmits a request for individual folder information corresponding to the individual folder ID, to the server apparatus 40 together with the password acquired from the user (S5010). When the password is correct, the server apparatus 40 transmits the individual folder information requested from the terminal apparatus 30 to the terminal apparatus 30 (S5012). Upon receiving the individual folder information from the server apparatus 40, the terminal apparatus 30 stores the folder identification information (S5014). At this time, the terminal apparatus 30 may also store information such as the folder name of the individual folder.

Next, the terminal apparatus 30 transmits data and the apparatus information 364 of the terminal apparatus 30 as well as the folder identification information to the image forming apparatus 10 (S5016). The image forming apparatus 10 identifies a folder from the folder identification information and stores the data received from the terminal apparatus 30 in the identified folder (S5018). After storing the data, the image forming apparatus 10 may transmit a response to the terminal apparatus 30, indicating that the data is stored (S5020). After receiving the response, the terminal apparatus 30 may display a message indicating that the data is stored.

According to the present embodiment, the terminal apparatus can acquire the information of the individual folder from the server apparatus without performing image recognition or short range wireless communications. The image forming apparatus can configure the same individual folder in a plurality of image forming apparatuses by acquiring the individual folder information from the server apparatus.

6. Sixth Embodiment

A sixth embodiment is an embodiment in which individual folders are grouped for each user who uses the system in the fifth embodiment. In the present embodiment, FIG. 29 of the fifth embodiment is replaced with FIG. 36, FIG. 30 of the fifth embodiment is replaced with FIG. 38, FIG. 31 of the fifth embodiment is replaced with FIG. 39, and FIG. 32 of the fifth embodiment is replaced with FIG. 40. Note that the same functional units and processing are denoted by the same reference numerals, and description thereof is omitted.

6.1 Functional Configuration

Figure 36:
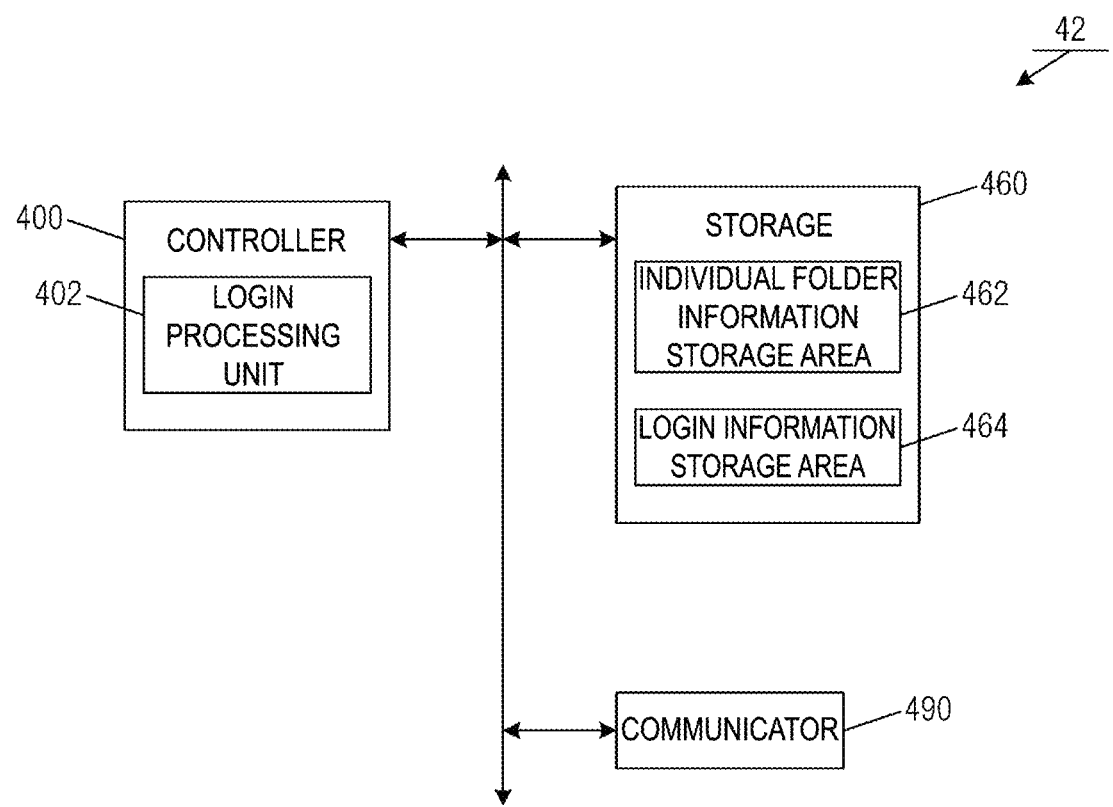
FIG. 36 is a diagram illustrating a functional configuration of a server apparatus of a sixth embodiment.

In the present embodiment, the server apparatus 40 of the fifth embodiment is replaced with a server apparatus 42. FIG. 36 is a diagram illustrating a functional configuration of the server apparatus 42. The server apparatus 42 is different from the server apparatus 40 in that the controller 400 functions as a login processing unit 402 and the storage 460 further secures a login information storage area 464 for storing information about login (login information).

When login data is received from another apparatus, the login processing unit 402 determines whether login of the user is permitted on the basis of the login data, and performs processing of transmitting information to the other apparatus in accordance with a result of the determination. The login data is data necessary for logging in to the server apparatus 42. The login data is, for example, an account name and a password. For example, when the login data received from another apparatus is included in any of pieces of login information to be described later, the login processing unit 402 permits the login as will be described below. When the login is permitted, the login processing unit 402 transmits information indicating that the login is permitted and user information (such as, for example, a user name and a contact address) which is information about the user who is permitted to log in to the apparatus that has transmitted the login data. The information about the user may be stored in advance in the storage 460, for example. On the other hand, when the login is not permitted, the login processing unit 402 transmits information (for example, error information) indicating that the login is not permitted to the apparatus that has transmitted the login data.

FIG. 37A is a diagram illustrating an example of a data configuration of the login information. The login information includes an account name (for example, "katou") that identifies the user and a password (for example, "qwe456") used for authentication of the user. Note that the login information may include information other than the above-described information (for example, information about the user).

FIG. 37B is a diagram illustrating an example of a data configuration of individual folder information according to the present embodiment. The individual folder information according to the present embodiment is different from the individual folder information illustrated in FIG. 3C in that an account name (for example, "katou") is further included. The account name is information that identifies a user who operates the apparatus corresponding to the apparatus information. In other words, the account name is information indicating the user who has transmitted the data when the individual folder is generated.

6.2 Processing Flow 6.2.1 Overview of Processing

Figure 38:
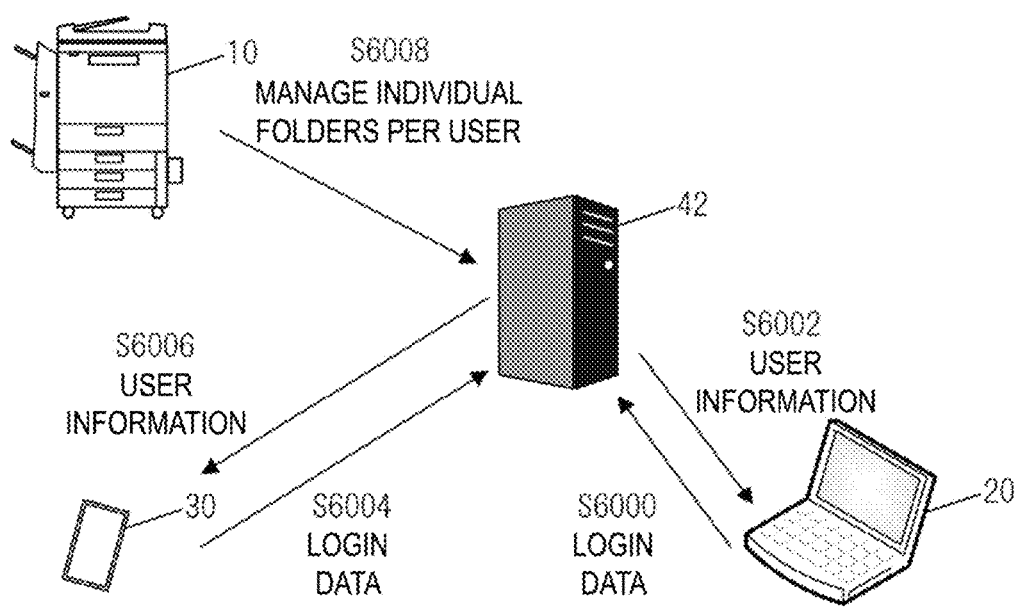
FIG. 38 is a diagram illustrating an overview of processing of the sixth embodiment.

FIG. 38 is a diagram illustrating an overview of processing of the present embodiment. When transmitting data to the individual folder, the information processing apparatus 20 transmits login data to the server apparatus 42 (S6000). The login data is data necessary for logging in to (user authentication) the server apparatus 42. The login data is, for example, an account name and a password. When the user is permitted to log in, the server apparatus 42 transmits the user information of the user to the information processing apparatus 20 (S6002). Upon receiving the user information, the information processing apparatus 20 can transmit data to the individual folder.

Similarly, when transmitting the data to the individual folder, the terminal apparatus 30 transmits the login data to the server apparatus 42 (S6004). When the user is permitted to log in, the server apparatus 42 transmits the user information of the user to the terminal apparatus 30 (S6006). The terminal apparatus 30 can transmit data to the individual folder upon receiving the user information.

The image forming apparatus 10 acquires the individual folder information from the server apparatus 42. The image forming apparatus 10 manages (for example, groups) individual folders for each user, on the basis of the account name included in the individual folder information (S6008).

6.2.2 Processing by Information Processing Apparatus

Figure 39:
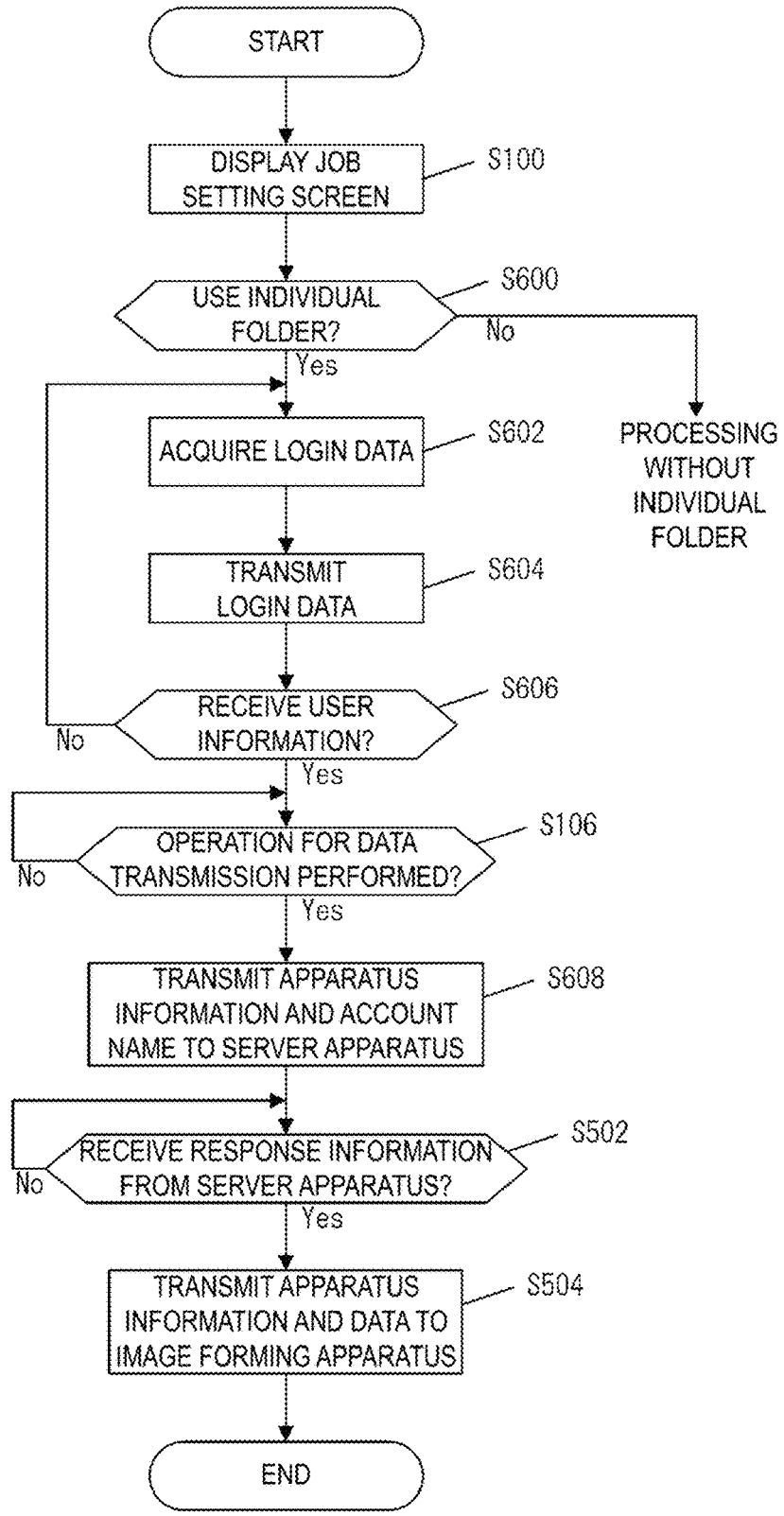
FIG. 39 is a diagram illustrating processing executed by the server apparatus of the sixth embodiment.

FIG. 39 is a flowchart illustrating a flow of processing executed by the information processing apparatus 20. When the user selects to use the individual folder (Yes in step S600), the controller 200 acquires the login data from the user (step S602) and transmits the acquired login data to the server apparatus 42 (step S604). For example, in step S602, the controller 200 displays a screen for inputting an account name and a password. Further, the controller 200 may acquire the account name and the password input by the user in step S604.

Subsequently, when the user information is received from the server apparatus 42, the controller 200 executes the processing of step S106 and the subsequent steps (Yes in step S606). On the other hand, when the user information is not received from the server apparatus 42 (for example, when error information is received), the controller 200 returns to step S602 (No in step S606, the processing proceeds to step S602). When the individual folder is not used, the controller 200 executes processing not using the individual folder (for example, processing using the user folder) (No in step S600).

When an operation for data transmission is performed, the controller 200 transmits the apparatus information and the account name to the server apparatus 42 (step S608).

6.2.3 Processing by Terminal Apparatus

Figure 40:
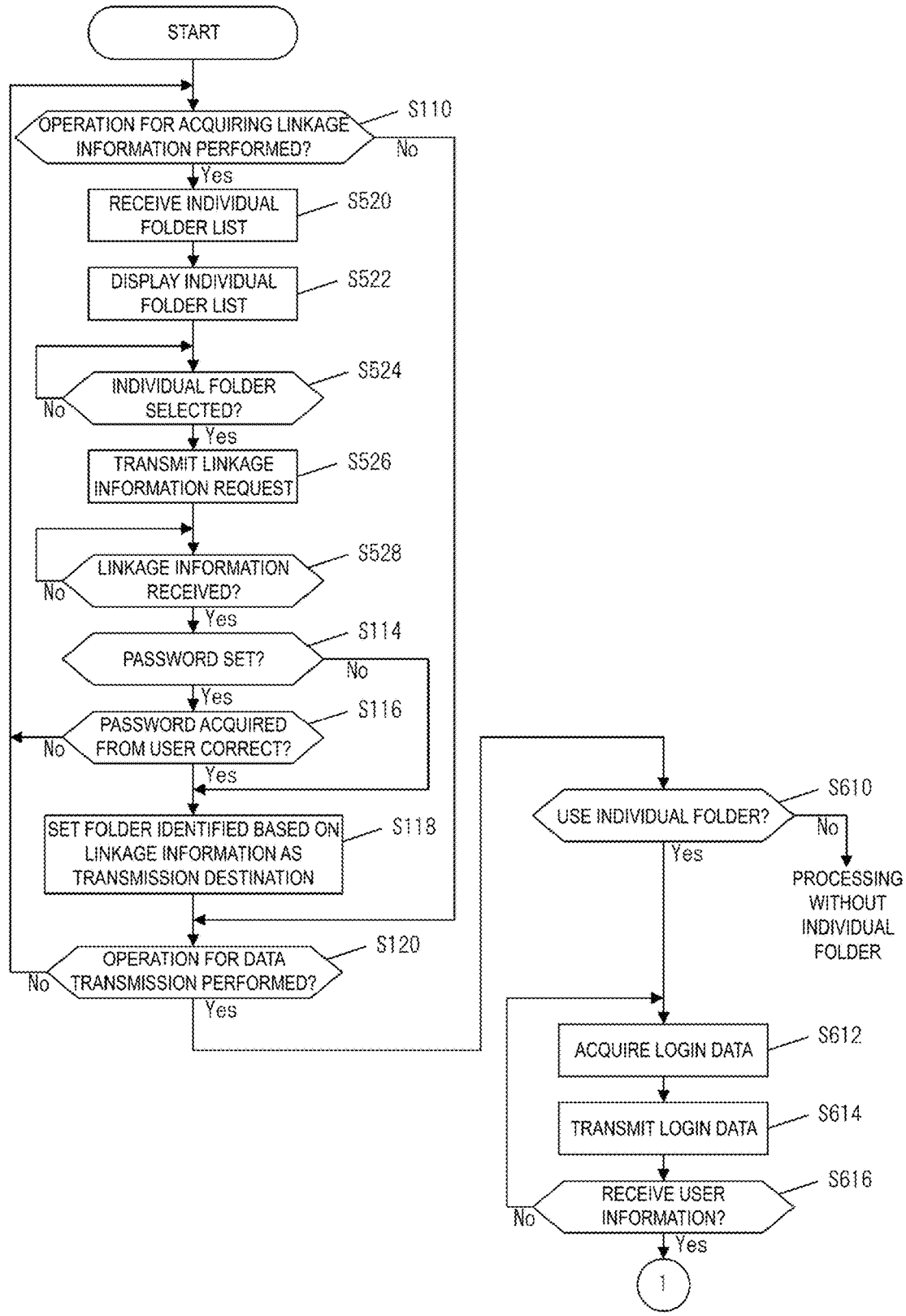
FIG. 40 is a diagram illustrating processing executed by an information processing apparatus of the sixth embodiment.

FIG. 40 is a diagram illustrating processing executed by the terminal apparatus 30. When the operation for data transmission is performed, the controller 300 determines whether to use the individual folder (step S610). For example, the controller 200 asks the user whether the individual folder is to be used.

When the user selects to use the individual folder (Yes in step S610), the controller 300 acquires the login data from the user (step S612) and transmits the acquired login data to the server apparatus 42 (step S614). The processing of step S612 and step S614 is the same as the processing of step S602 and step S604 in FIG. 39.

When the user information is received from the server apparatus 42, the controller 300 illustrates the processing illustrated in FIG. 10 (Yes in step S616). On the other hand, when the user information is not received from the server apparatus 42, the controller 300 returns to step S612 (No in step S616, the processing proceeds to step S612). When the individual folder is not used, the controller 200 executes processing not using the individual folder (for example, processing using the user folder) (No in step S610).

6.2.4 Processing by Server Apparatus

The controller 400 of the server apparatus 42 executes the processing illustrated in FIG. 33. Here, the controller 400 determines whether the apparatus information and the account name are received in step S540. When the individual folder information is stored in step S544, the account name received in step S540 is also included in the individual folder information and stored.

Further, the controller 400 realizes a function as the login processing unit 402. Accordingly, when the server apparatus 42 receives login data from another apparatus, the server apparatus 42 transmits information, on the basis of whether to permit the login, to the other apparatus.

6.2.5 Processing by Image Forming Apparatus

The controller 100 of the image forming apparatus 10 executes the processing illustrated in FIG. 34. Further, the controller 100 executes the individual folder display processing illustrated in FIG. 13 as the individual folder display processing in step S142. At this time, in step S170 in FIG. 13, the controller 100 groups and displays individual folders with a common account name stored in the individual folder information. Thus, the controller 100 can group individual folders for each user on the basis of the account name.

According to the system of the present embodiment, it is possible to log in to the server apparatus through the setting screen of the printer driver or the setting screen of the data transmission application, and to transmit data to a predetermined individual folder when the user logs in.

7. Modified Example

The present disclosure is not limited to the embodiments described above and can be changed in various manners. In other words, embodiments obtained by combining technical mechanisms appropriately changed without departing from the gist of the present disclosure are also included in the technical scope of the present disclosure. Although some parts of the above-described embodiments are described separately for convenience of explanation, it is a matter of course that combinations can be executed within a technically allowable range.

The programs running on each device in the embodiments are programs for controlling a CPU or the like (programs for causing a computer to function) to realize the aforementioned functions in the embodiments. The information handled by these devices is temporarily accumulated in a temporary storage device (for example, a RAM) at the time of processing, is then stored in a storage device such as a read only memory (ROM) or an HDD, and is read, corrected, and written by the CPU as needed.

In addition, the terminal apparatus of the present disclosure may be configured to acquire the linkage information by recognizing the linkage information displayed on another device.

In addition, the terminal apparatus of the present disclosure may be configured to prompt the user to input the password when the password has been set for the individual folder identified on the basis of the linkage information after the linkage information has been acquired.

Further, the terminal apparatus of the present disclosure may be configured to display a name of the individual folder as the information of the individual folder.

The image forming apparatus of the present disclosure may be configured to display, for each individual folder in the storage unit, linkage information including folder identification information that identifies the individual folder.

The image forming apparatus of the present disclosure may be configured to display information of the first individual folder and information of the second individual folder when grouping the first individual folder and the second individual folder, and to perform grouping when grouping of the first individual folder and the second individual folder is selected by the user.

The present disclosure may be configured as a system including: an information processing apparatus including a first controller and a display; and a terminal apparatus including a second controller and a communicator that can communicate with an image forming apparatus that can output data stored in an individual folder, wherein the first controller displays linkage information on the display in response to a user operation, and the second controller acquires the linkage information by recognizing the linkage information displayed on the display, sets a first individual folder identified on the basis of the linkage information as a transmission destination, and transmits the data to the first individual folder set as the transmission destination.

The recording medium storing the programs may be any of a semiconductor medium (for example, a ROM, a non-volatile memory card, or the like), an optical recording medium, a magneto-optical recording medium (for example, a digital versatile disc (DVD), a magneto optical disc (MO), a mini disc (MD), a compact disc (CD), a Blu-ray (trade name) disc (BD) or the like), a magnetic recording medium (for example, a magnetic tape, a floppy disk, or the like), or the like. Not only the aforementioned functions of the embodiments are realized by executing the loaded programs, but also the functions of the present disclosure may be realized by performing processing in cooperation with an operating system, another application program, or the like on the basis of instructions of the programs.

In a case where the programs are distributed to the market, the programs can be stored and distributed in a portable recording medium, or can be transferred to a server computer connected via a network such as the Internet. In this case, it is a matter of course that the storage device of the server computer is also included in the present disclosure.

In addition, each functional block or various features of the apparatus used in the above-described embodiments may be implemented or executed by an electric circuit, for example, an integrated circuit or a plurality of integrated circuits. An electrical circuit designed to perform the functions described herein may include a general-purpose processor, a digital signal processor (DSP), an application specific integrated circuit (ASIC), a field programmable gate array (FPGA) or other programmable logic device, discrete gate or transistor logic, discrete hardware components, or a combination thereof. A general-purpose processor may be a microprocessor, or any known processor, controller, microcontroller, or state machine. The above-described electric circuit may be constituted by a digital circuit or an analog circuit. In addition, in a case where an integrated circuit technology that replaces a current integrated circuit appears due to advancements in semiconductor technology, one or more aspects of the present disclosure can use a new integrated circuit on the basis of the technology.

REFERENCE SIGNS LIST 1, 2 System
10 Image forming apparatus
100 Controller
102 Image processor
120 Image input unit
130 Image former
140 Display
150 Operation inputter
160 Storage
162 Data storage area
1620 User folder storage area
1622 Individual folder storage area
164 User information storage area
166 User folder information storage area
168 Individual folder information storage area
170 Group information storage area
180 Short range wireless communicator
190 Communicator
20 Information processing apparatus
200 Controller
240 Display
250 Operation inputter
260 Storage
262 Printer driver
264 Apparatus information
290 Communicator
30 Terminal apparatus
300 Controller
320 Imager
340 Display
350 Operation inputter
360 Storage
362 Data transmission application
364 Apparatus information
366 Setting table
380 Short range wireless communicator
390 Communicator
40, 42 Server apparatus
400 Controller 460 Storage
462 Individual folder information storage area
464 Login information storage area
490 Communicator

The invention claimed is:

1. A terminal apparatus comprising:
a communicator that communicates with an image forming apparatus that generates individual folders for storing data for each transmission of source that transmits the data;
a controller; and
a storage, wherein
the controller
acquires linkage information, including apparatus information, that identifies the individual folders, and
transmits the data stored in the storage with a first individual folder set as a transmission destination, the first individual folder being identified based on the linkage information.

2. The terminal apparatus according to claim 1, wherein the controller displays the acquired linkage information on an information processing apparatus that transmits the data to the first individual folder as the transmission destination.

3. The terminal apparatus according to claim 2, wherein the controller acquires the linkage information by recognizing the linkage information displayed as a two-dimensional code.

4. The terminal apparatus according to claim 1, wherein the controller acquires the linkage information, corresponding to the first individual folder, from the linkage information associated with each of the individual folders displayed on the image forming apparatus.

5. The terminal apparatus according to claim 1, further comprising:
a display, wherein
the controller
displays a list of information of the individual folders of the image forming apparatus on the display, and
acquires the linkage information, including folder identification information, that identifies one of the individual folders selected by a user.

6. The terminal apparatus according to claim 1, further comprising:
a short range wireless communicator that performs short range wireless communication with the image forming apparatus, wherein
the controller
performs the short range wireless communication with the image forming apparatus via the short range wireless communicator, and
acquires the information of the individual folders and the linkage information from the image forming apparatus.

7. The terminal apparatus according to claim 1, wherein the controller
communicates with a server apparatus storing information of the individual folder included in the image forming apparatus via a communicator, and
acquires the information of the individual folders and the linkage information from the server apparatus.

8. The terminal apparatus according to claim 1, wherein the controller causes the image forming apparatus to store the data in a second individual folder when the first individual folder is not set as the transmission destination.

9. An image forming apparatus comprising:
an image former that outputs data;
a communicator that communicates with a terminal apparatus;
a storage; and
a controller, wherein
the storage includes an individual folder being generated based on each transmission source that transmits the data,
the controller
receives the data and folder identification information, including apparatus information, that identifies the individual folder from the terminal apparatus via the communicator,
stores the data received from the terminal apparatus in a first individual folder based on the folder identification information identifying the individual folder when the folder identification information identifying the individual folder is received, and
generates a second individual folder in the storage and stores the data received from the terminal apparatus in the second individual folder when the folder identification information identifying the individual folder is not received.

10. The image forming apparatus according to claim 9, wherein the controller generates the first individual folder in the storage when the data is received from an information processing apparatus via the communicator.

11. The image forming apparatus according to claim 9, further comprising:
a display, wherein
the controller causes the terminal apparatus to display, on the display, linkage information, including the apparatus information, for acquiring the folder identification information that identifies the first individual folder.

12. The image forming apparatus according to claim 9, wherein, when the folder identification information is received and the second individual folder is stored in the storage, the controller groups the first individual folder and the second individual folder.

13. The image forming apparatus according to claim 12, wherein, when the storage includes the first individual folder and the second individual folder, the controller groups the first individual folder and the second individual folder based on an operation of a user.

14. The image forming apparatus according to claim 13, wherein the controller changes a name of a group or displays information of a group in response to an operation of the user.

15. The image forming apparatus according to claim 9, wherein
the communicator communicates with a server apparatus storing information of individual folders, and
the controller generates a corresponding individual folder in the storage according to the information of the individual folders.

16. The image forming apparatus according to claim 15, wherein
the individual folders are associated with users, and
the controller groups the individual folders for each user.

17. A system comprising:
a first device provided with a storage includes a plurality of folders; and
a second device capable of communicating with the first device,
wherein
the first device outputs linkage information, including apparatus information, that indicates a first folder, the second device, having obtained the linkage information, transmits to the first device folder identification information, including the apparatus information, and data that indicates a folder identified based on the linkage information,
the second device, having received the data from the first device together with the folder identification information, stores the data in the first folder identified from the linkage information, and
the second device, having received the data from the first device without the folder identification information, stores the data in a second folder different from the first folder.

* * * * *